United States Patent
Irschara et al.

(10) Patent No.: US 11,036,240 B1
(45) Date of Patent: Jun. 15, 2021

(54) SAFE LANDING OF AERIAL VEHICLES UPON LOSS OF NAVIGATION

(71) Applicant: Amazon Technologies, Inc., Seattle, WA (US)

(72) Inventors: Arnold Irschara, Graz (AT); Martin Lenz, Graz (AT); Werner Trobin, Graz (AT)

(73) Assignee: Amazon Technologies, Inc., Seattle, WA (US)

( * ) Notice: Subject to any disclaimer, the term of this patent is extended or adjusted under 35 U.S.C. 154(b) by 76 days.

(21) Appl. No.: 16/010,948

(22) Filed: Jun. 18, 2018

(51) Int. Cl.
| | | |
|---|---|---|
| *G05D 1/10* | (2006.01) | |
| *B64C 39/02* | (2006.01) | |
| *G01C 21/16* | (2006.01) | |
| *G01C 21/00* | (2006.01) | |
| *G01S 19/15* | (2010.01) | |
| *G01S 19/24* | (2010.01) | |
| *G06K 9/00* | (2006.01) | |
| *G01S 19/48* | (2010.01) | |

(52) U.S. Cl.
CPC .......... *G05D 1/101* (2013.01); *B64C 39/024* (2013.01); *G01C 21/005* (2013.01); *G01C 21/16* (2013.01); *G01S 19/15* (2013.01); *G01S 19/24* (2013.01); *G01S 19/48* (2013.01); *G06K 9/00637* (2013.01); *G06K 9/00657* (2013.01); *B64C 2201/024* (2013.01); *B64C 2201/027* (2013.01); *B64C 2201/128* (2013.01); *B64C 2201/145* (2013.01); *B64C 2201/18* (2013.01)

(58) Field of Classification Search
CPC .......... G06K 9/00657; G06K 9/00637; G05D 1/101; B64C 39/024; B64C 2201/128; B64C 2201/18; B64C 2201/024; B64C 2201/145; B64C 2201/027; G01C 21/16; G01C 21/005; G01S 19/24; G01S 19/48; G01S 19/15

See application file for complete search history.

(56) References Cited

U.S. PATENT DOCUMENTS

| | | | | |
|---|---|---|---|---|
| 9,524,648 | B1* | 12/2016 | Gopalakrishnan | .... B64C 39/024 |
| 10,403,153 | B2* | 9/2019 | Glaab | ................... B64D 47/06 |
| 2015/0323932 | A1* | 11/2015 | Paduano | ................ G05D 1/042 |
| | | | | 701/3 |
| 2015/0346722 | A1* | 12/2015 | Herz | ..................... G05D 1/0038 |
| | | | | 701/2 |

(Continued)

*Primary Examiner* — Dale W Hilgendorf
*Assistant Examiner* — Alexander C. Bost
(74) *Attorney, Agent, or Firm* — Athorus, PLLC

(57) ABSTRACT

An aerial vehicle is programmed to proceed to a safe landing area upon a loss of GPS signals or other navigational signals. The aerial vehicle is programmed with a location of the safe landing area, and a visual descriptor of a landmark at the safe landing area. The landmark may be any natural or man-made structure or feature associated with the safe landing area, and the visual identifier may be any set of data corresponding to one or more contours, outlines, colors, textures, silhouettes or shapes of the landmark. Upon determining that a GPS position may not be determined, or shortly thereafter, the aerial vehicle proceeds on a course toward the location of the safe landing area, and begins to capture imaging data. The aerial vehicle confirms that it has arrived at the safe landing area upon detecting the visual identifier within the imaging data, and initiates a landing operation.

20 Claims, 18 Drawing Sheets

(56) References Cited

U.S. PATENT DOCUMENTS

| | | | |
|---|---|---|---|
| 2016/0068264 A1* | 3/2016 | Ganesh | G06Q 10/0833 |
| | | | 701/2 |
| 2016/0274577 A1* | 9/2016 | Heinonen | B64D 1/08 |
| 2016/0347462 A1* | 12/2016 | Clark | B64C 39/024 |
| 2017/0249852 A1* | 8/2017 | Haskins | G08G 5/025 |
| 2017/0308100 A1* | 10/2017 | Iskrev | G05D 1/10 |
| 2018/0101173 A1* | 4/2018 | Banerjee | G06T 7/70 |
| 2018/0114450 A1* | 4/2018 | Glaab | G05D 1/0055 |
| 2019/0009904 A1* | 1/2019 | Winkle | G08G 5/0013 |
| 2019/0079509 A1* | 3/2019 | Bosworth | B64D 1/08 |
| 2019/0088144 A1* | 3/2019 | Argo | G08G 5/0013 |
| 2019/0197291 A1* | 6/2019 | Zhu | G05D 1/0676 |
| 2019/0302276 A1* | 10/2019 | Sandford | G01S 19/48 |

* cited by examiner

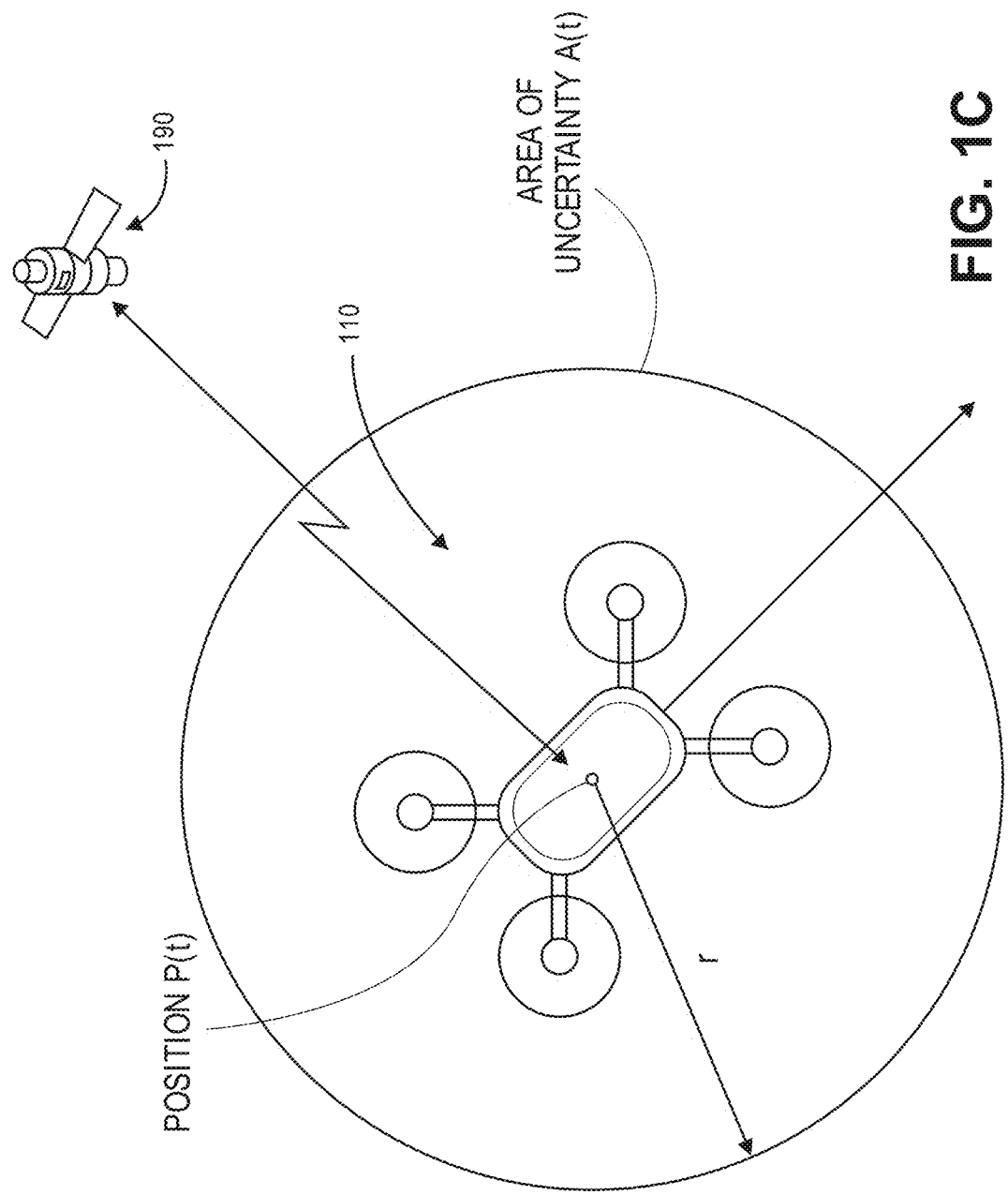

SAFE LANDING OF AERIAL VEHICLES UPON LOSS OF NAVIGATION

BACKGROUND

Many autonomous vehicles (e.g., unmanned aerial vehicles or autonomous ground vehicles) feature one or more components for determining information regarding positions, orientations, velocities or accelerations of such vehicles or devices, and for providing navigational advice or instructions based on such information. For example, some vehicles and computer devices include Global Positioning System (or "GPS") transceivers for determining positions using data received from one or more orbiting satellites, or cellular telephone equipment configured to estimate (e.g., triangulate) a position using signals received from one or more cellular telephone network towers or other network sources.

A GPS-enabled vehicle (or other device, system or component) may determine its position by interpreting signals that are received from multiple GPS satellites. A distance between a GPS receiver and a GPS satellite may be determined by calculating a "time of flight" between the GPS satellite and the GPS receiver for each such signal, which is assumed to travel at approximately the speed of light. Where three or more such signals are interpreted, the GPS receiver may be determined to be located at a specific point on the planet to within a certain degree of accuracy or tolerance, commonly on the order of two to ten meters.

Occasionally, position information determined using GPS satellites and GPS-enabled vehicles may be inaccurate, irrelevant or unavailable. For example, like any computer device, most GPS-enabled equipment requires an initialization period during which GPS position information obtained or determined by such equipment is unreliable. Furthermore, where an environment includes many natural or artificial obstructions, such as tree limbs, office towers, mountains, walls or ceilings, the receipt of GPS signals by a GPS-enabled vehicle may be delayed or otherwise interpreted as having arrived in an untimely manner. Moreover, the use of GPS satellites and GPS-enabled vehicles necessarily relies on the viability of the GPS system as a whole. Like any computer-based system or communications system, the GPS system is at risk, at least theoretically, of hacking, spoofing or jamming, and may be taken offline or rendered unavailable for one or more legitimate or illegitimate purposes from time to time.

BRIEF DESCRIPTION OF THE DRAWINGS

FIGS. 1A through 1G are views of aspects of one system for safely landing an aerial vehicle in accordance with embodiments of the present disclosure.

DETAILED DESCRIPTION

As is set forth in greater detail below, the present disclosure is directed to enabling the safe landing of aerial vehicles upon a loss of navigation signals. More specifically, some of the systems and methods of the present disclosure are directed to programming aerial vehicles with locations of landing areas where an aerial vehicle may land in the event of a loss of navigation systems or controls, and visual descriptors of such landing areas, e.g., aspects of various landmarks within a vicinity of the landing area. In the event that an aerial vehicle determines that navigation signals are no longer available, or that the aerial vehicle is no longer receiving navigation signals, the aerial vehicle may capture imaging data from its surroundings, and evaluate the imaging data to search for one or more visual descriptors corresponding to a landing area, and, upon matching the visual descriptors to the imaging data, proceed toward the landing area accordingly. The visual descriptors of the landing area can be any type or form of digital descriptions of aspects of a landmark, e.g., vectors or other sets of data regarding the landmark that are generated by a machine learning system or other algorithm based on imaging data, or portions of the landmark such as contours, outlines, colors, textures, silhouettes, shapes or other characteristics that are depicted within the imaging data. A landing area may be identified where aspects of imaging data corresponding to a landmark are detected within imaging data captured by an aerial vehicle, e.g., where the visual descriptors of the landmark are matched in the imaging data captured by the aerial vehicle. By relying on visual descriptors of nearby landmarks to detect a landing area, a location of the landing area may be detected more efficiently than if the imaging data were processed as a whole to detect the landing area.

Furthermore, in some embodiments, where a general location of a landing area is known, a position of an aerial vehicle may be tracked by dead reckoning from a location where navigational signals are determined to have been lost to a general location of the landing area based on a last known valid position of the aerial vehicle, subject to sensor drift or any variables or errors in the dead-reckoned position. When an aerial vehicle arrives at what is believed to be the general location of the landing area, as determined by dead reckoning, such as when the general location of the landing area is within an area of uncertainty in a position of the aerial vehicle, the aerial vehicle may begin to search for the landing area by capturing imaging data and determining whether a visual descriptor of a landmark at the landing area may be matched to the imaging data accordingly.

Figure 1A:
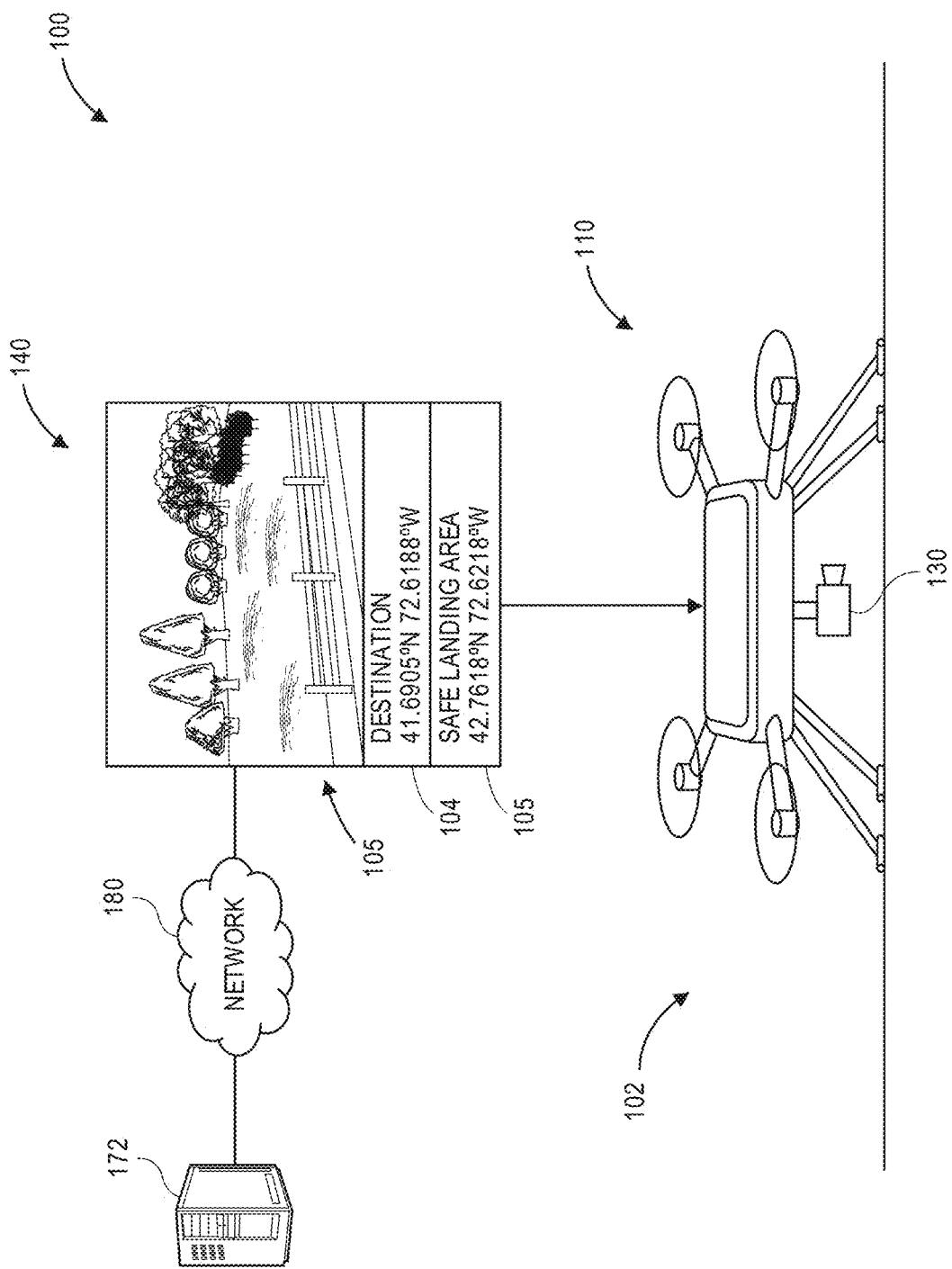

Referring to FIGS. 1A through 1G, views of aspects of one system 100 for safely landing an aerial vehicle 110 in accordance with the present disclosure are shown. As is shown in FIG. 1A, the system 100 includes the aerial vehicle 110, a server 172 (or other computer device or machine) that are connected to one another over a network 180, which may include the Internet in whole or in part. The aerial vehicle 110 features one or more imaging devices 130 (e.g., digital cameras for capturing visual imaging data and/or depth imaging data), and is shown in FIG. 1A in a grounded state at an origin 102. The aerial vehicle 110 receives data regarding a destination 104 for a mission, e.g., coordinates or other identifiers of a location of the destination 104, from the server 172 over the network 180.

As is shown in FIG. 1A, the aerial vehicle 110 also receives information regarding a visual descriptor 140 of a landmark at a safe landing area 105, along with coordinates or other identifiers of the safe landing area 105, from the server 172. In some embodiments, the safe landing area 105 may have been identified as "safe," or as capable of accommodating the aerial vehicle 110 based on information or data captured during one or more prior missions by the aerial vehicle 110, or by one or more other aerial vehicles within a vicinity of the safe landing area 105. Alternatively, in some embodiments, the safe landing area 105 may also be identified as capable of accommodating the aerial vehicle 110 based on any other type or form of information or data, e.g., imaging data captured by one or more orbiting satellites or other sources, topographical data, or data regarding prevailing weather or other environmental conditions within a vicinity of the safe landing area 105. In some other embodiments, the safe landing area 105 may be identified as capable of accommodating the aerial vehicle 110 where the safe landing area 105 is determined to have complied with one or more laws, regulations, restrictions, or contractual requirements, e.g., where the safe landing area 105 is sufficiently flat or otherwise properly graded, where a number of personnel at the safe landing area 105 is sufficiently low, or where a fee (e.g., rent) for the use of the safe landing area 105 has been paid.

For example, the visual descriptor 140 may be any set of data that may be identified or detected from imaging data captured from one or more landmarks associated with the safe landing area 105. For example, the visual descriptor 140 may be a set of data descriptive of or associated with one or more contours, outlines, colors, textures, silhouettes, shapes or other characteristics of landmarks depicted within the imaging data. Alternatively, the visual descriptor 140 may be a vector or other set of data obtained based on an output from a trained machine learning system or algorithm, e.g., based on an input that includes imaging data captured from the landmarks. The visual descriptor 140 need not have any semantic relationship with the landing area or the landmark, nor be visually discernible within imaging data by humans.

Furthermore, the aerial vehicle 110 may be programmed with any number of visual descriptors 140 that have been derived for any number of landmarks. For example, the aerial vehicle 110 may be programmed with a single visual descriptor 140 that describes or relates to a plurality of landmarks, or, alternatively, the aerial vehicle 110 may be programmed with a plurality of visual descriptors 140 that describe or relate to a single landmark. Additionally, the visual descriptor 140 may be tagged with coordinates or identifiers of the safe landing area 105, or accompanied by one or more records of information or data regarding contents of imaging data captured from the safe landing area 105, e.g., in one or more prior missions or other events occurring at the safe landing area 105.

Figure 1B:
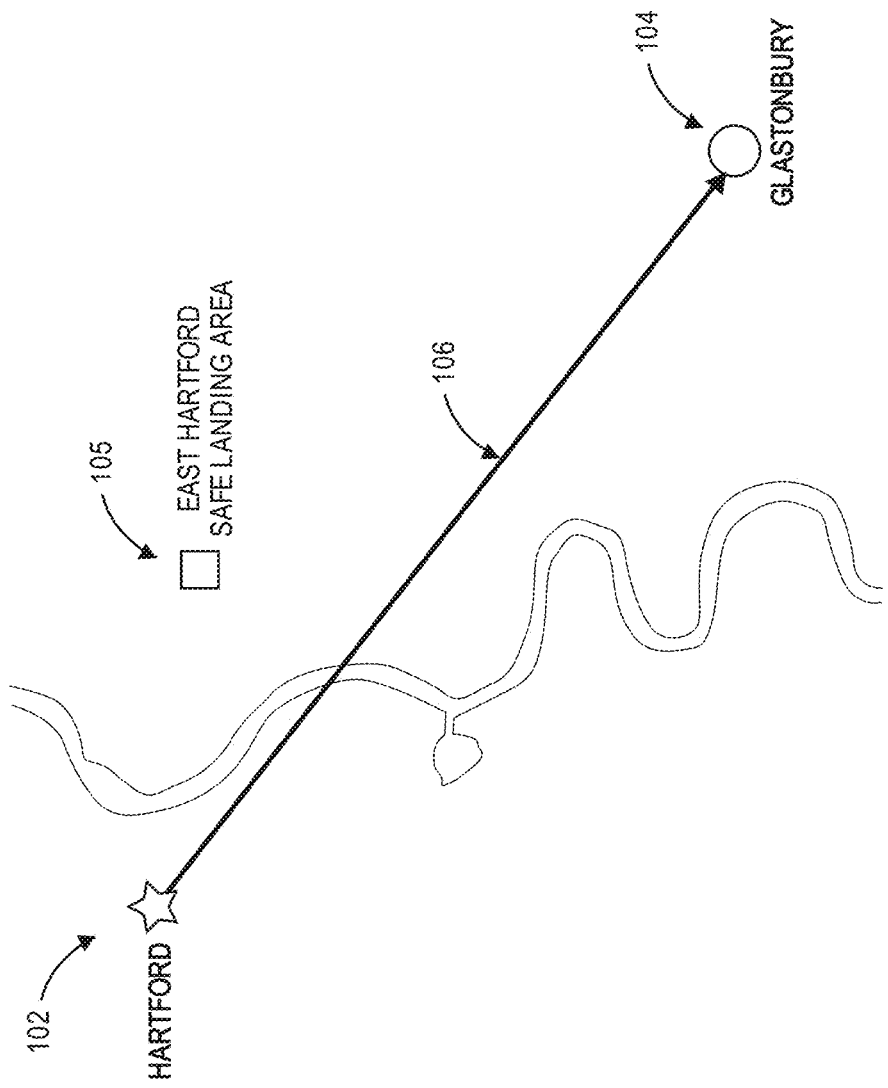

As is shown in FIG. 1B, a route 106 from the origin 102 to the destination 104 is shown. Additionally, a location of the safe landing area 105 is also shown with respect to the route 106.

As the aerial vehicle 110 travels from the origin 102 to the destination 104, positions of the aerial vehicle 110 may be determined based on signals received from a global navigation system, and the aerial vehicle 110 may track its positions with respect to uncertainties associated with such signals. As is shown in FIG. 1C, a position P(t) of the aerial vehicle 110 may be determined at a given time t based on signals received from satellites of the Global Positioning System ("GPS") 190, and an area of uncertainty A(t) may be defined with respect to tolerances in the position P(t). For example, as is shown in FIG. 1C, the area of uncertainty A(t) is shown as a circle having a constant radius r corresponding to a level of accuracy in the position P(t), which is approximately eight meters (8 m) where the position P(t) is determined based on GPS navigation signals.

Figure 1D:
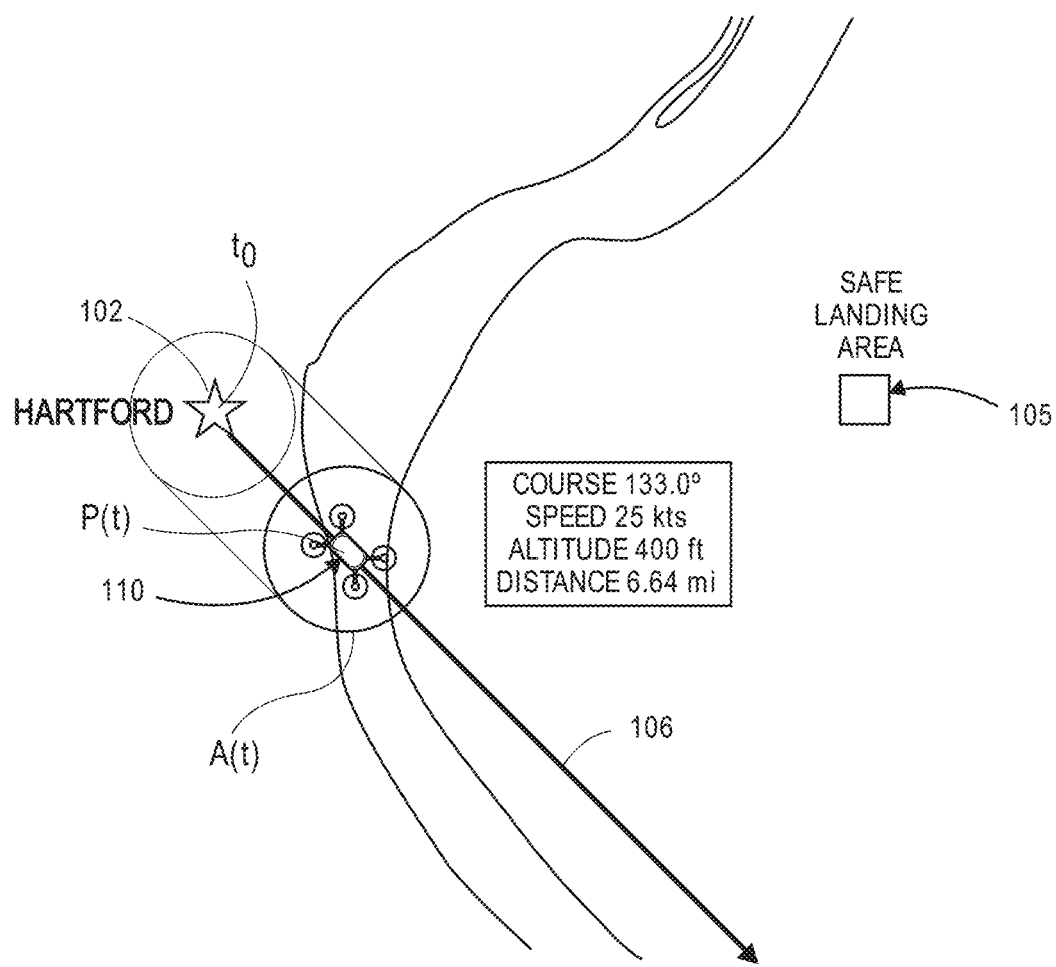

As is shown in FIG. 1D, the aerial vehicle 110 departs from the origin 102 at a time to, traveling on the route 106, which has a course of one hundred thirty-three degrees (133.0°), at an air speed of twenty-five knots (25 kts), and at an altitude of four hundred feet (400 ft) toward the destination 104, which is approximately 6.64 miles away from the origin 102. The position P(t) of the aerial vehicle 110, and the area of uncertainty A(t) for the position P(t), are determined as the aerial vehicle 110 travels from the origin 102 to the destination 104 based on signals received from the GPS system 190. Because a level of accuracy associated with GPS positions is substantially constant, the radius r and the area of uncertainty A(t) are substantially constant when signals are available from a sufficient number of satellites. As is also shown in FIG. 1D, the safe landing area 105 is located within a vicinity of the aerial vehicle 110, as the aerial vehicle 110 travels from the origin 102 to the destination 104.

The aerial vehicle 110 may occasionally experience a loss of navigation signals from the GPS system 190. Where the loss of the navigation signals is brief in duration, the aerial vehicle 110 may continue on its course to the destination 104 and may track its position, e.g., by dead reckoning, until the navigation signals are received from the aerial vehicle 110 again.

Figure 1E:
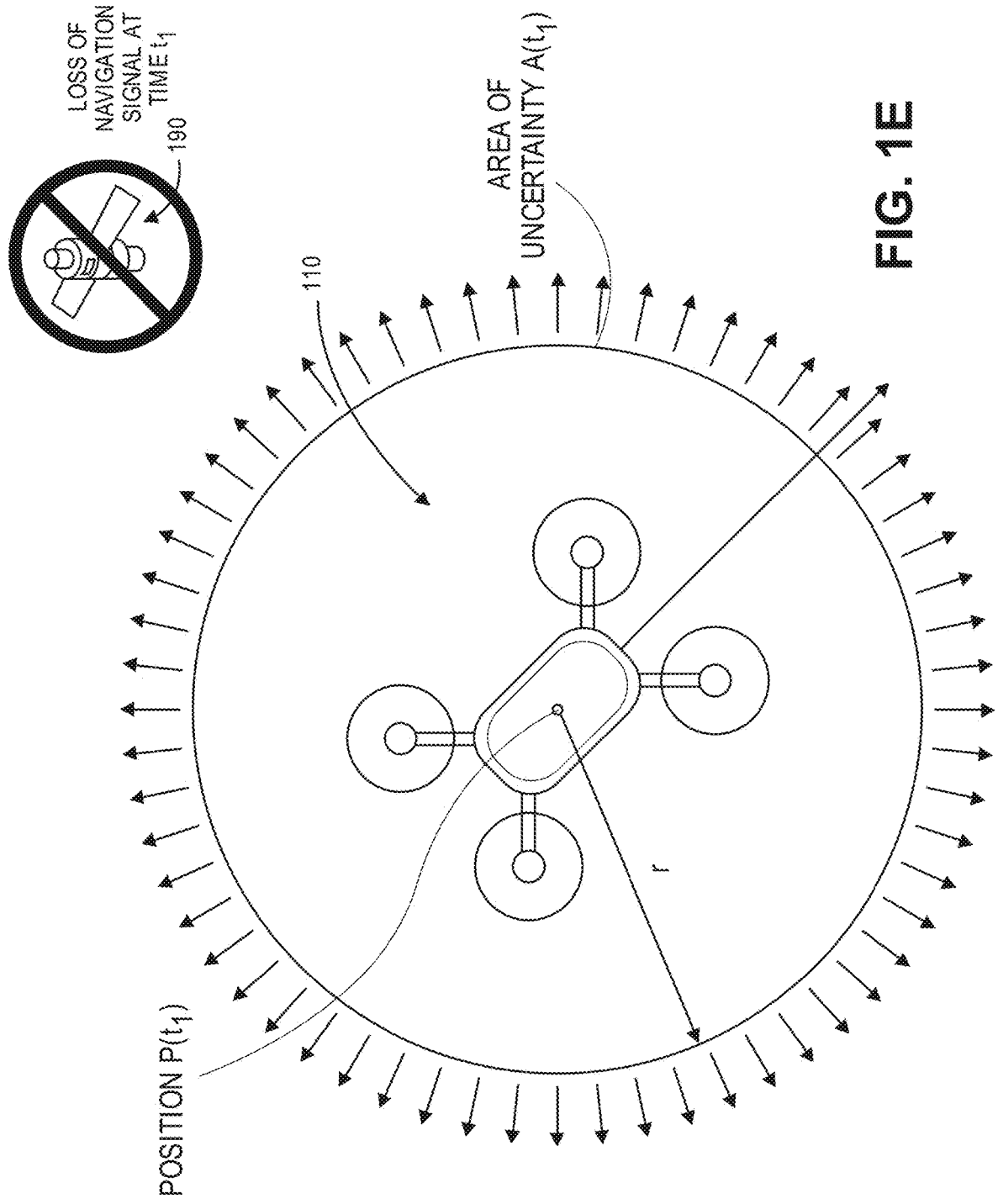

As is shown in FIG. 1E, where the navigation signals are lost for more than a predetermined duration, e.g., ten seconds or more, the position P(t) of the aerial vehicle 110 may be tracked from a previously determined position based on a known course and a known airspeed of the aerial vehicle 110. The radius r and the area of uncertainty A(t) may continue to grow as the aerial vehicle 110 travels on the course and at the speed, based on any sensor drift or any other anticipated or measured factors affecting the position P(t) of the aerial vehicle 110 based on the motion of the aerial vehicle 110.

Figure 1F:
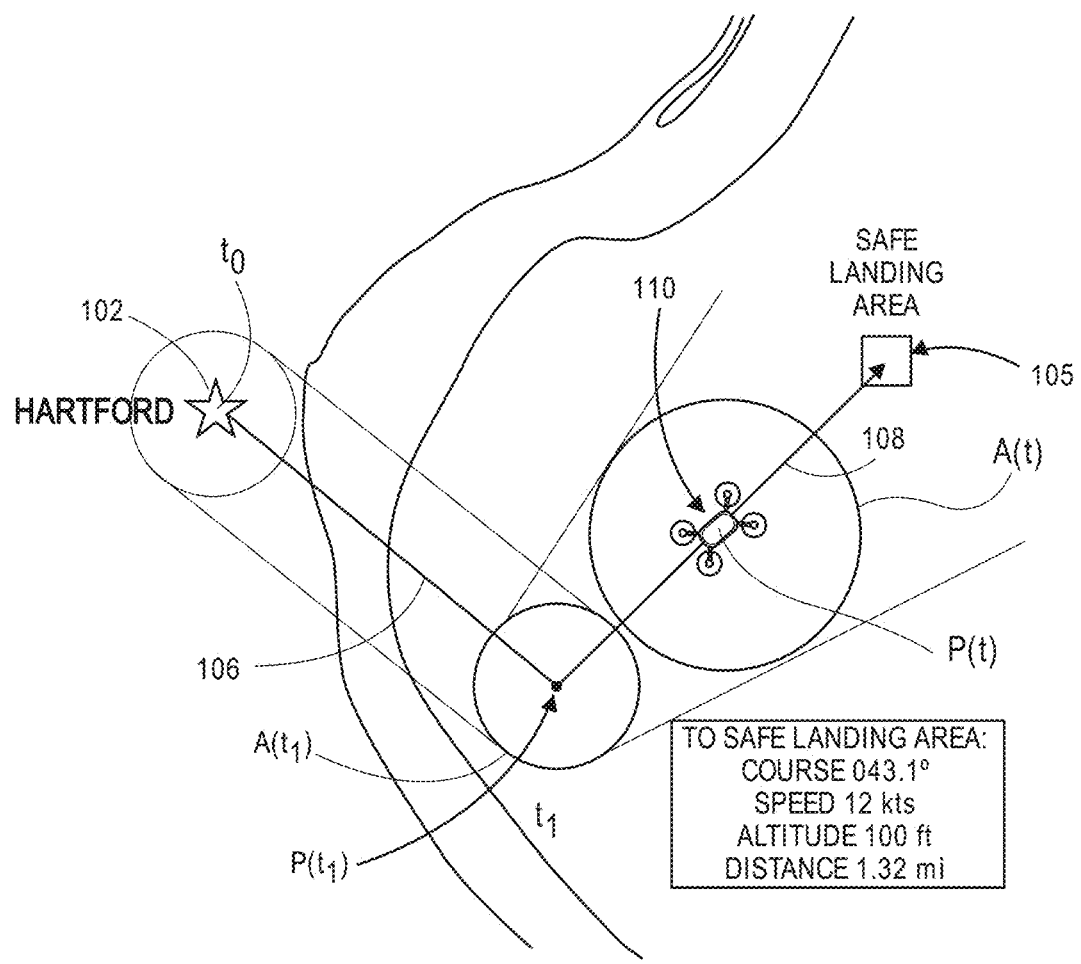

As is shown in FIG. 1F, at a time $t_1$, and a position $P(t_1)$, the aerial vehicle 110 may determine that communication with the GPS system 190 may not be restored, and proceed on a route 108 from a last known valid position, or a dead-reckoned position, toward the safe landing area 105. For example, as is shown in FIG. 1F, the aerial vehicle 110 may turn toward the safe landing area 105, viz., by turning to a course of forty-three and one-tenth degrees (043.1°), and traveling at an air speed of twelve knots (12 kts), and at an altitude of one hundred feet (100 ft) toward the safe landing area 105, which is approximately 1.32 miles from the position $P(t_1)$.

As is also shown in FIG. 1F, the size of the area of uncertainty A(t) continues to expand in the absence of communication with the GPS system 190. For example, whereas a level of accuracy of a position P(t) determined from navigation signals received from the GPS system 190 is approximately eight meters, an area of uncertainty will continue to expand as long as navigation signals are unavailable, and a fix in the position P(t) may not be determined from the GPS system 190. In some embodiments, an observed sensor of a dead reckoned position of an aerial vehicle in the absence of navigation signals from the GPS system 190 may be approximately one half of one percent of a distance traveled, or one percent of a distance traveled. Thus, as the aerial vehicle 110 travels approximately 1.32 miles (or approximately seven thousand feet) from the position $P(t_1)$ to the location of the safe landing area 105, the area of uncertainty A(t) may grow by approximately thirty-five to seventy feet (or 35-70 ft), or eleven to twenty-two meters (11-22 m).

Figure 1G:
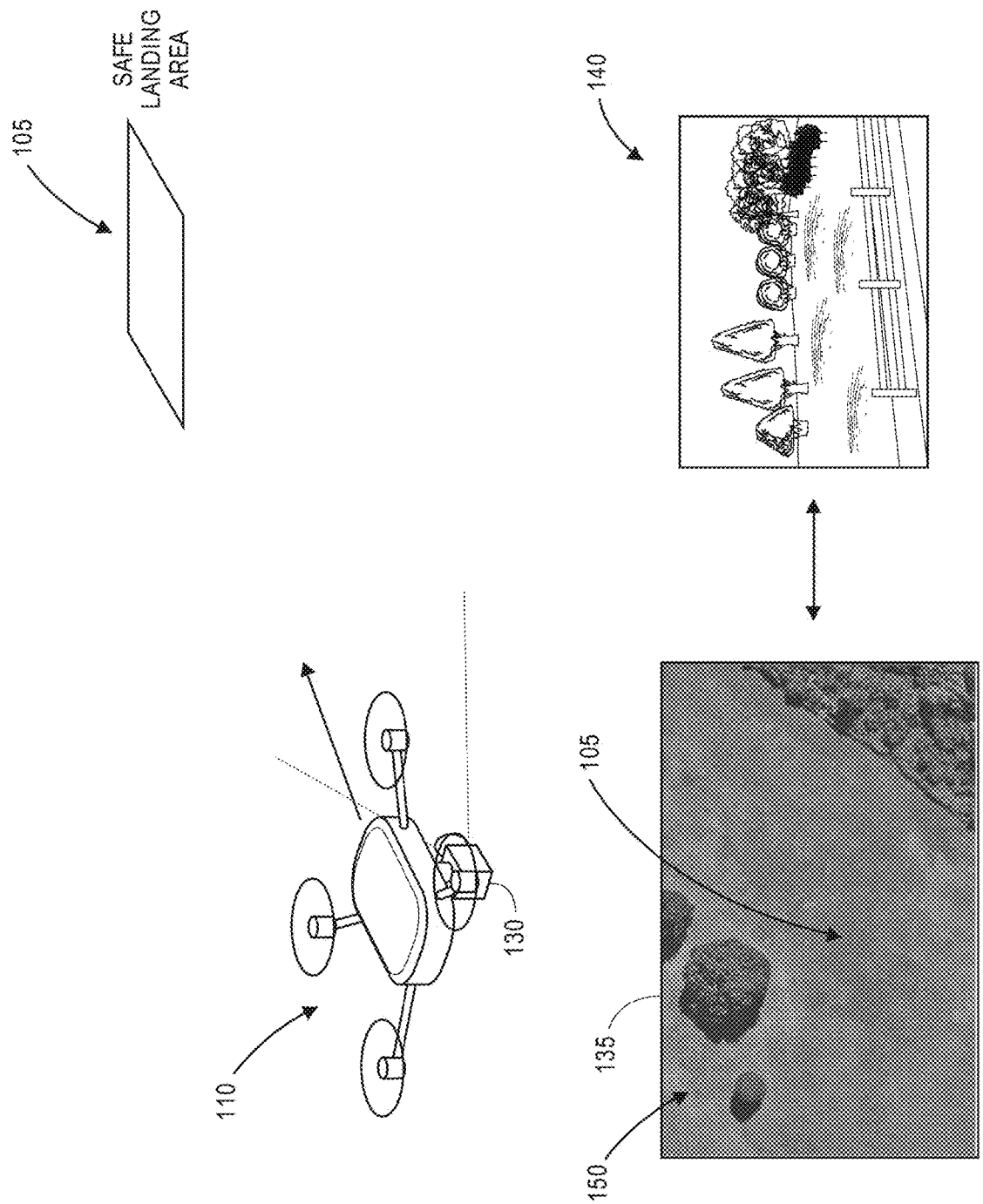

As is shown in FIG. 1G, as the aerial vehicle 110 approaches the safe landing area 105, the aerial vehicle 110 begins to capture imaging data by the imaging device 130, e.g., when the aerial vehicle 110 determines that the location of the landmark or the location of the safe landing area 105 are within the area of uncertainty A(t). One or more image frames 135 captured by the imaging device 130 may be processed to determine whether the image frames 135 depict or are otherwise consistent with the descriptor 140 of one or more landmarks at the landing area 105. Where the visual descriptor 140 is generated by an algorithm or technique (e.g., a detection or recognition algorithm, or a machine learning technique), the imaging data can be processed according to the same algorithm or technique to determine whether the visual descriptor 140 is present therein. For example, a visual descriptor may be generated based on an output of the algorithm or technique, and compared to the visual descriptor 140 to determine whether the visual descriptor 140 may be matched to the imaging data. Alternatively, the imaging data may be compared to the visual descriptor 140 directly.

Where the image frames 135 are determined to depict or otherwise be consistent with a landmark at the landing area 105, the aerial vehicle 110 may be determined to have located the landing area 105, despite the loss of the navigation signals, and may initiate a landing operation at the landing area 105.

Accordingly, the systems and methods of the present disclosure may be used to aid an unmanned aerial vehicle in landing at a safe location when the unmanned aerial vehicle experiences a loss of navigation signals, and the precise positioning that is determined from such signals. The unmanned aerial vehicle may be programmed with a location of a safe landing area, e.g., one or more sets of coordinates of the safe landing area, as well as a visual descriptor of one or more landmarks at the safe landing area. Upon determining that navigation signals are lost, and are not likely to be recovered, the unmanned aerial vehicle may proceed on a course toward the safe landing area, and at an acceptable speed and altitude. When the unmanned aerial vehicle is within a vicinity of the safe landing area, e.g., at a position determined by dead reckoning, such as where the unmanned aerial vehicle is within an area of uncertainty defined based on tolerances or accuracies of the dead reckoned position, the unmanned aerial vehicle may begin to capture imaging data of its surroundings from one or more fields of view. If the unmanned aerial vehicle detects the visual descriptor within the captured imaging data, the unmanned aerial vehicle may confirm its location at the safe landing area, and may initiate a landing operation accordingly.

The systems and methods of the present disclosure thus enable an unmanned aerial vehicle to confirm its location at a safe landing area based on a limited amount of imaging data, e.g., by programming the unmanned aerial vehicle with coordinates and visual descriptors of one or more landmarks at the safe landing area, rather than imaging data corresponding to an entire region in which the unmanned aerial vehicle is expected to operate, or may possibly operate.

Currently, many vehicles or mobile devices, or persons equipped with such devices, (e.g., automobiles and/or aerial vehicles having one or more of such devices onboard, or pedestrians, cyclists or other individuals bearing a mobile device such as a smartphone or tablet computer), may determine their respective positions using various means or methods, such as a locating module that obtains a geocode or other data regarding a location of the vehicle or mobile device at an associated level of accuracy or tolerance. Most commonly, vehicles or mobile devices include GPS sensors, microchips or other components that determine locations by interpreting signals from one or more GPS satellites. The GPS system comprises twenty-four satellites that circle the planet every twelve hours at an altitude of approximately eleven thousand nautical miles, and are maintained aloft by the United States Air Force. GPS-equipped devices typically operate by measuring the transit times of signals received from multiple satellites, which generally travel at the speed of light (viz., 186,000 miles per second, or $3.0 \times 10^8$ meters per second), and determining distances to the respective satellites based on the transit times. Using three or more such signals, an approximate position of a GPS-enabled device may be determined to within a defined degree or level of accuracy. By some estimates, American GPS satellites may provide users with an accuracy level of approximately 7.8 meters (m), ninety-five percent of the time, anywhere around the planet. Other positioning systems, such as the Global Navigation Satellite System (or "GLONASS") operated by Russia, the Galileo GNSS System operated by the European Space Agency, or the BeiDou Navigation Satellite System operated by China, also rely on satellites to provide position data to ground-based receivers.

Occasionally, however, some errors or inaccuracies may be encountered when determining positions using GPS systems. For example, propagation delays in the transmission of satellite signals may affect the speed of such signals through the ionosphere or troposphere. Additionally, positioning systems, such as the GPS system, the GLONASS system or the Galileo GNSS system, operate using global standards of time, e.g., by using global clocks. Any clocking delays may occasionally affect a determination of a distance between a device and a satellite, and a position of the device based on such a distance. Moreover, where GPS signals from one or more signals are blocked or impaired by vegetation or man-made structures, the accuracy of a position determined based on the interpretation of such signals may be called into question. Furthermore, in some applications, a position of a GPS-enabled device may be desired at a greater level of accuracy or precision than is currently available through the use of standard GPS systems and technology.

The systems and methods of the present disclosure are directed to landing aerial vehicles at safe landing areas upon a loss of navigation, e.g., where navigation signals are no longer being received by, or available to, an aerial vehicle. The aerial vehicle may be programmed with information or data regarding locations of safe landing areas, and visual descriptors of landmarks at the safe landing areas. Thus, upon a loss of navigation, the aerial vehicle may proceed in a direction of a location of a safe landing area, and capture imaging data regarding its surroundings. The aerial vehicle may confirm its position within a vicinity of the safe landing area where one or more visual descriptors may be detected or otherwise recognized within the imaging data.

The visual descriptors may be sets of any type of data regarding one or more landmarks at a landing area that may be compared to (e.g., matched) with contents of imaging data captured by an aerial vehicle. For example, in some embodiments, the visual descriptors may be information or data regarding contours, outlines, colors, textures, silhouettes, shapes or other characteristics of one or more landmarks depicted within the imaging data. The visual descriptors may be detected from or generated based on imaging data previously captured from the landmark, and programmed into one or more aerial vehicles in association with information or data regarding one or more landing areas, including but not limited to locations (e.g., coordinates) of such landmarks and/or such landing areas. In some other embodiments, the visual descriptors may be vectors or any other sets of data regarding a visual appearance of a landmark associated with a landing area, and may be generated by any algorithm or system, or according to any technique.

The visual descriptors may be matched with imaging data in any manner, in accordance with the present disclosure. For example, a visual descriptor may be defined by a set of keypoints that are present within one or more images captured from a landmark at a landing area. Imaging data that is subsequently captured by an aerial vehicle in search of a landing area may be evaluated to determine whether the keypoints are present therein. Keypoints are points of interest that are present within an image, and which correspond to specific aspects or features of the imaging data. Thus, when an image is processed by rotation, expansion or translation, or is distorted, e.g., by one or more transformations, or in any other manner, keypoints within an image are typically detectable regardless of the processing. In some embodiments, a visual descriptor may be defined based on the locations, the scale and/or the orientation of one or more keypoints within an image. Imaging data captured by an aerial vehicle may be matched to a visual descriptor by determining whether the imaging data depicts the same keypoints in the same locations, at the same scale and in the same orientation. Where a visual descriptor defined for a landmark at a landing area is matched to imaging data captured by an aerial vehicle, the aerial vehicle may be determined to be at a location corresponding to the landmark, and within a vicinity of the landing area.

Moreover, the same landmark may be represented by any number of visual descriptors. For example, imaging data regarding a given landmark may be captured at various times of day, during different seasons, as well as during different lighting, weather or operational conditions. Visual descriptors may be derived from such imaging data and associated with a given landing area from time to time, such as where a status of one or more landmarks or landing areas has changed. Furthermore, visual descriptors may be generated for any number of landmarks that may be associated with a landing area (e.g., any number of trees, plant life, buildings, landmasses or components thereof). When an aerial vehicle detects one or more of such landmarks within imaging data based on such visual descriptors, the aerial vehicle may be confirmed to be at a position associated with such landmarks, and a location of a safe landing area may be determined accordingly.

In some embodiments, a visual descriptor of a landmark may be a machine-learned, discriminant image patch representation. For example, a visual descriptor may be formed by performing a non-linear mapping of image intensities into a high-dimensional space. In such a space, vectors may be quantized to remain sparse, which results in the generation of visual descriptors that are compact yet descriptive. A machine learning algorithm that is responsible for generating visual descriptors may have an optimization objective to adjust its non-linear mappings in order to ensure that different images of a common point on a scene remain close to one another within the high-dimensional space, e.g., despite the fact that the images of the common point may be captured under different illumination conditions or from different viewpoints, and that descriptors of other points on the scene differ from one another as much as possible. Any type of machine learning algorithm or technique may be used to generate a visual descriptor from imaging data, or to compare visual descriptors and/or imaging data to one another in accordance with embodiments of the present disclosure. Moreover, visual descriptors need not have any semantic meaning or relationship to an image, nor be readily indicative of a portion of an image from which the visual descriptors were generated. Furthermore, a plurality of descriptors of one or more landmarks at a landing area may be assembled or aggregated and in association with a given landing area. An aerial vehicle may be determined to be within a vicinity of a landing area where one, some or all of such landmarks are detected within imaging data based on the visual descriptors.

Figure 2:
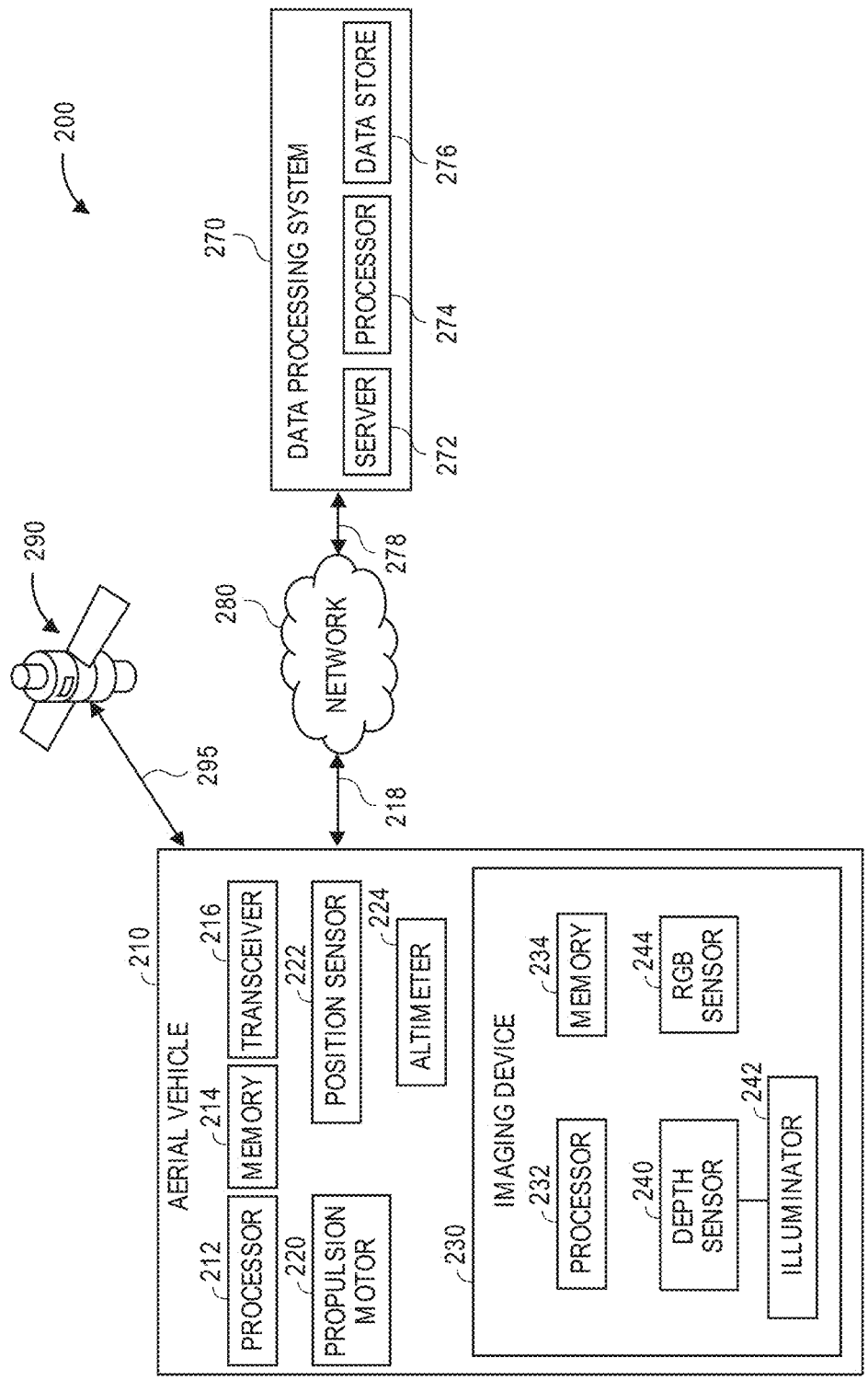
FIG. 2 is a block diagram of one system for safely landing an aerial vehicle in accordance with embodiments of the present disclosure.

Referring to FIG. 2, a block diagram of components of one system 200 for safely landing an aerial vehicle 210 in accordance with embodiments of the present disclosure is shown. The system 200 of FIG. 2 includes an aerial vehicle 210 and a data processing system 270 connected to one another over a network 280, which may include the Internet, in whole or in part. Except where otherwise noted, reference numerals preceded by the number "2" shown in FIG. 2 indicate components or features that are similar to components or features having reference numerals preceded by the number "1" shown in FIGS. 1A through 1G.

The aerial vehicle 210 includes a processor 212, a memory 214 and a transceiver 216, one or more propulsion motors 220, a position sensor 222, an altimeter 224 and an imaging device 230. The processor 212 may be configured to perform any type or form of computing function, including but not limited to the execution of one or more machine learning algorithms or techniques. For example, the processor 212 may control any aspects of the operation of the aerial vehicle 210 and the one or more computer-based components thereon, including but not limited to the propulsion motors 220, the position sensors 222 and/or the altimeter 224. The processor 212 may further control any aspects of the operation of any number of additional components that may be provided thereon, including but not limited to one or more fixed or movable (e.g., repositionable or reorientable) control surfaces such as wings, rudders, ailerons, elevators, flaps, brakes or slats, or other features; one or more sensors (e.g., digital cameras or other imaging devices, as well as radar sensors, laser sensors, or any other sensor that is configured to capture information or data in a specific direction or along a specific axis); one or more illuminators (e.g., fixed or addressable lights configured to project light of any color, frequency or wavelength, in any direction); and one or more engagement systems. Furthermore, the processor 212 may control the operation of one or more control systems or modules (not shown), e.g., for generating instructions for operating one or more of the propulsion motors 220, the position sensors 222, the altimeter 224 and/or one or more control surfaces, sensors, illuminators or engagement systems. Alternatively, the processor 212 may be a component part of one or more of such control systems.

The processor 212 may be a uniprocessor system including one processor, or a multiprocessor system including several processors (e.g., two, four, eight, or another suitable number), and may be capable of executing instructions. For example, in some embodiments, the processor 212 may be a general-purpose or embedded processor implementing any of a number of instruction set architectures (ISAs), such as the x86, PowerPC, SPARC, or MIPS ISAs, or any other suitable ISA. Where the processor 212 is a multiprocessor system, each of the processors within the multiprocessor system may operate the same ISA, or different ISAs.

The aerial vehicle 210 further includes one or more memory or storage components 214 (such as databases or data stores) for storing any type of information or data, e.g., instructions for operating the aerial vehicle 210, or information or data captured during operations of the aerial vehicle 210. Additionally, the memory 214 may be configured to store executable instructions, flight paths, flight control parameters and/or other data items accessible by or to the processor 212. The memory 214 may be implemented using any suitable memory technology, such as static random access memory (SRAM), synchronous dynamic RAM (SDRAM), nonvolatile/Flash-type memory, or any other type of memory. In some embodiments, program instructions, flight paths, flight control parameters and/or other data items may be received or sent via the transceiver 216, e.g., by transmission media or signals, such as electrical, electromagnetic, or digital signals, which may be conveyed via a communication medium such as a wired and/or a wireless link.

The transceiver 216 may enable the aerial vehicle 210 to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the network 280 or directly. The transceiver 216 may further include or be in communication with one or more input/output (or "I/O") interfaces, network interfaces and/or input/output devices, and may be configured to allow information or data to be exchanged between one or more of the components of the aerial vehicle 210, or to one or more other computer devices or systems (e.g., other aerial vehicles, not shown) via the network 280. For example, in some embodiments, the transceiver 216 may be configured to coordinate I/O traffic between the processor 212 and one or more onboard or external computer devices or components. The transceiver 216 may perform any necessary protocol, timing or other data transformations in order to convert data signals from a first format suitable for use by one component into a second format suitable for use by another component. In some embodiments, the transceiver 216 may include support for devices attached through various types of peripheral buses, e.g., variants of the Peripheral Component Interconnect (PCI) bus standard or the Universal Serial Bus (USB) standard. In some other embodiments, functions of the transceiver 216 may be split into two or more separate components, or incorporated directly into the processor 212.

In some embodiments, the transceiver 216 may transmit and/or receive signals according to the Bluetooth® Low Energy, e.g., within a frequency spectrum of approximately 2.4000 to 2.4835 gigahertz (GHz), and in two-megahertz (2 MHz) channels, or according to the Ultra Wideband standard, e.g., within a frequency spectrum of approximately 3.1 to 10.6 gigahertz (GHz), with bandwidths of at least five hundred megahertz (500 MHz), or at least twenty percent of a center frequency. The transceiver 216 may include any number of processors, chips (e.g., chipsets) or other components that are commonly associated with or required for communication according to a selected communications protocol or standard, or programmed as necessary (e.g., with one or more applications and/or sets of instructions) in order to communicate according to the selected protocol or standard. The signals transmitted and/or received by the transceiver 216 may be of any kind or type, and may be sent over the network 280, e.g., as is indicated by line 218.

The propulsion motors 220 may be any type or form of motor (e.g., electric, gasoline-powered or any other type of motor) capable of generating sufficient rotational speeds of one or more propellers or other components to provide lift and/or thrust forces to the aerial vehicle 210 and any engaged payload, and to aerially transport the engaged payload thereby. For example, one or more of the propulsion motors 220 may be a brushless direct current (DC) motor such as an outrunner brushless motor or an inrunner brushless motor. The aerial vehicle 210 may include any number of such propulsion motors 220 of any kind. For example, one or more of the motors 220 may be aligned or configured to provide forces of lift to the aerial vehicle 210, exclusively, while one or more of the propulsion motors 220 may be aligned or configured to provide forces of thrust to the aerial vehicle 210, exclusively. Alternatively, one or more of the propulsion motors 220 may be aligned or configured to provide forces of lift and forces of thrust to the aerial vehicle 210, as needed. For example, the propulsion motors 220 may be fixed in their orientation on the aerial vehicle 210, or configured to vary their respective orientations, e.g., a tilt-rotor aircraft. Moreover, the propulsion motors 220 may be aligned or configured to operate with different capacities or ratings, or at different speeds, or coupled to propellers having different sizes and shapes.

The position sensor 222 may be any type of sensor that is configured to determine a position of the aerial vehicle 210 in space, including but not limited to a GPS receiver that is configured to receive signals (e.g., trilateration data or information) relating to a position of the aerial vehicle 210 from one or more satellites of a GPS network 280, e.g., as is indicated by line 295. Alternatively, the position sensor 222 may be or include one or more accelerometers for detecting and/or measuring accelerations of the aerial vehicle 210 in one or more translational or rotational dimensions or directions. The position sensor 222 may be or include one or more compasses for determining one or more directions with respect to a frame of reference that is fixed with respect to the surface of the Earth (e.g., a pole). The position sensor 222 may also be or include one or more gyroscopes that are adapted to determine an angular orientation of the aerial vehicle 210, e.g., based on principles of angular momentum.

The altimeter 224 may be any type of sensor or meter for determining an altitude of the aerial vehicle 210. For example, the altimeter 224 may include any number of barometers, transmitters, receivers, range finders (e.g., laser and/or radar) or any other features. For example, the altimeter 224 may be or include a pressure altimeter, a sonic altimeter and/or a radar altimeter. An altitude of the aerial vehicle 210 may be determined using any type of sensor or system in accordance with the present disclosure. For example, an altitude of the aerial vehicle 210 may be determined by the position sensor 220, e.g., where the position sensor 220 is or comprises a GPS receiver.

The imaging device 230 may be any form of optical recording devices that may be used to photograph or otherwise record imaging data of structures, facilities, terrain or any other elements appearing within their respective fields of view. The imaging device 230 may include one or more sensors, memory or storage components and processors, and such sensors, memory components or processors may further include one or more photosensitive surfaces, filters, chips, electrodes, clocks, boards, timers, power sources, connectors or any other relevant features (not shown). The imaging device 230 may capture imaging data in the form of one or more still or moving images of any kind or form, as well as any relevant audio signals or other information. The imaging device 230 may also be independently adapted or otherwise configured to communicate with the data processing system 270 by way of the network 280.

For example, the imaging device 230 may include one or more sensors, memory or storage components and processors, and such sensors, memory components or processors may further include one or more photosensitive surfaces, filters, chips, electrodes, clocks, boards, timers or any other relevant features (not shown). As is shown in FIG. 2, imaging device 230 includes one or more optical sensors, including a one or more depth sensors 240, one or more illuminators 242 and one or more RGB sensors 244 (or grayscale sensors or black-and-white sensors) that are configured to capture visual imaging data (e.g., textures) or depth imaging data (e.g., ranges) to objects within one or more fields of view of the imaging device 230.

The depth sensors 240 and the RGB sensors 244 may be any sensors having single elements or a plurality of photoreceptors or photosensitive components (e.g., a CCD sensor, a CMOS sensor, or another sensor), which may be typically arranged in an array. Light reflected from objects within a field of view of the imaging device 230 may be captured by the depth sensors 240 and the RGB sensors 244, and quantitative values, e.g., pixels, may be assigned to one or more aspects of the reflected light. The illuminators 242 may be any system such as a laser system or a light-emitting diode (or "LED") for illuminating a portion of a scene appearing within a field of view of the imaging device 230 by light at any wavelength, e.g., by infrared or near-infrared light, such as light with wavelengths ranging from approximately seven hundred to approximately one thousand nanometers (700-1000 nm).

The imaging device 230 further includes one or more processors 232 and one or more memory components 234, and any other components (not shown) that may be required in order to capture, analyze and/or store imaging data. For example, the imaging device 230 may capture one or more still or moving images (e.g., streams of visual and/or depth image frames), along with any relevant audio signals or other information (e.g., position data), and may also connect to or otherwise communicate with the server 272, or any other computer devices over the network 280, through the sending and receiving of digital data. In some implementations, the imaging device 230 may be configured to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, either by way of the servers 272 or over the network 280 directly. The processors 232 may be configured to process imaging data captured by one or more of the depth sensors 240 or the RGB sensors 244. For example, in some implementations, the processors 232 may be configured to execute any type or form of machine learning algorithm or technique, e.g., an artificial neural network.

The imaging device 230 may be homogenous or heterogeneous in nature, in accordance with the present disclosure. For example, the imaging device 230 may have both the depth sensor 240 and the RGB sensor 244. Alternatively, the imaging device 230 may have just a depth sensor 240 or just a RGB sensor 244 (or grayscale sensor or black-and-white sensor). For example, the imaging device 230 may be an RGB color camera, a still camera, a motion capture/video camera or any other type or form of camera. In other implementations, the imaging device 230 may be depth-sensing cameras, such as an RGBz or RGBD camera. In still other implementations, the imaging device 230 may be a thermographic or infrared (IR) camera. Additionally, in some implementations, the imaging device 230 may simply be a camera module that includes a lens and an image sensor configured to convert an optical image obtained using the lens of the camera into a digital signal or digital representation of the image (generally referred to herein as imaging data).

The imaging device 230 may also include manual or automatic features for modifying their respective fields of view or orientations. For example, the imaging device 230 may be configured in a fixed position, or with a fixed focal length (e.g., fixed-focus lenses) or angular orientation. Alternatively, the imaging device 230 may include one or more motorized features for adjusting a position of the imaging device, or for adjusting either the focal length (e.g., zooming the imaging device) or the angular orientation (e.g., the roll angle, the pitch angle or the yaw angle), by causing changes in the distance between the sensor and the lens (e.g., optical zoom lenses or digital zoom lenses), changes in the location of the imaging device 230, or changes in one or more of the angles defining the angular orientation.

For example, the imaging device 230 may be hard-mounted to a support or mounting that maintains the device in a fixed configuration or angle with respect to one, two or three axes. Alternatively, however, the imaging device 230 may be provided with one or more motors and/or controllers for manually or automatically operating one or more of the components, or for reorienting the axis or direction of the device, i.e., by panning or tilting the device. Panning an imaging device may cause a rotation within a horizontal axis or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device.

The imaging device 230 may digitally or electronically adjust an image identified in a field of view, subject to one or more physical and operational constraints. For example, a digital camera may virtually stretch or condense the pixels of an image in order to focus or broaden a field of view of the digital camera, and also translate one or more portions of images within the field of view. Imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Once the characteristics of stationary or moving objects or portions thereof have been recognized in one or more digital images, such characteristics of the objects or portions thereof may be matched against information regarding contours, outlines, colors, textures, silhouettes, shapes or other characteristics of known objects, which may be stored in one or more data stores. In this regard, stationary or moving objects may be classified based at least in part on the extent to which the characteristics identified in one or more digital images correspond to one or more of the characteristics of the known objects.

In addition to the imaging device 230, the aerial vehicle 210 may also include any number of other sensors, components or other features (not shown) for controlling or aiding in the operation of the aerial vehicle 210, including but not limited to speedometers (e.g., anemometers), thermometers, barometers, hygrometers, air monitoring sensors (e.g., oxygen, ozone, hydrogen, carbon monoxide or carbon dioxide sensors), infrared sensors, ozone monitors, pH sensors, magnetic anomaly detectors, metal detectors, radiation sensors (e.g., Geiger counters, neutron detectors, alpha detectors), attitude indicators, depth gauges or sound sensors (e.g., microphones, piezoelectric sensors, vibration sensors or other transducers for detecting and recording acoustic energy from one or more directions). Such sensors may include any number of memory or storage components and processors, photosensitive surfaces, filters, chips, electrodes, clocks, boards, timers or any other relevant features (not shown).

Although the block diagram 200 of FIG. 2 includes a single box corresponding to the aerial vehicle 210, and a single box corresponding to the imaging device 230, those of ordinary skill in the pertinent arts will recognize that the system 200 may include any number of aerial vehicles, each having any number of imaging devices, including features that are identical to one another, or are customized in any manner. For example, each of the aerial vehicles in the system 200 may include one or more of the components of the aerial vehicle 210, e.g., the propulsion motor 220, the position sensor 222 and/or the altimeter 224, or any number of additional components and/or sensors (not shown).

Additionally, the system 200 may include any number of other sources and/or remote devices (not shown) that perform one or more of the functions or tasks described above with regard to the aerial vehicle 210 and/or the data processing system 270. As is discussed above, the functions or tasks described above with regard to the aerial vehicle 210 may also be performed by any type of other vehicle (e.g., a manned or unmanned automobile or other vehicle), or by any other type of computing device, e.g., a mobile device such as a smartphone and/or tablet computer. Such other devices may include any number of the components described above with regard to the aerial vehicle 210, in the same configuration or in different configurations.

The data processing system 270 includes one or more physical computer servers 272 and/or processors 274 having a plurality of data stores 276 associated therewith, and the servers 272, the processors 274 and/or the data stores 276 may be provided for any specific or general purpose. For example, the data processing system 270 of FIG. 2 may be independently provided for the exclusive purpose of receiving, analyzing or storing information or data received from the aerial vehicle 210, e.g., position information and/or imaging data, or, alternatively, provided in connection with one or more physical or virtual services. The servers 272 may be connected to or otherwise communicate with the processors 274 and/or the data stores 276. The data stores 276 may store any type of information or data, including but not limited to acoustic signals, information or data relating to imaging data, or information or data regarding environmental conditions, operational characteristics, or positions, for any purpose. The servers 272 and/or the computer processors 274 may also connect to or otherwise communicate with the network 280, as indicated by line 278, through the sending and receiving of digital data. For example, the data processing system 270 may include any facilities, stations or locations having the ability or capacity to receive and store information or data, such as signals and/or position information or data, in one or more data stores, or from one or more other external computer systems (not shown) via the network 280. In some embodiments, the data processing system 270 may be provided in a physical location. In other such embodiments, the data processing system 270 may be provided in one or more alternate or virtual locations, e.g., in a "cloud"-based environment. In still other embodiments, the data processing system 270 may be provided onboard one or more aerial vehicles, including but not limited to the aerial vehicle 210.

The network 280 may be any wired network, wireless network, or combination thereof, and may comprise the Internet in whole or in part. In addition, the network 280 may be a personal area network, local area network, wide area network, cable network, satellite network, cellular telephone network, or combination thereof. The network 280 may also be a publicly accessible network of linked networks, possibly operated by various distinct parties, such as the Internet. In some embodiments, the network 280 may be a private or semi-private network, such as a corporate or university intranet. The network 280 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The aerial vehicle 210 and/or the data processing system 270 may use any web-enabled or Internet applications or features, or any other client-server applications or features including E-mail or other messaging techniques, to connect to the network 280, or to communicate with one another, such as through short or multimedia messaging service (SMS or MMS) text messages. For example, the aerial vehicle 210 may be adapted to transmit information or data in the form of synchronous or asynchronous messages to the data processing system 270 or to any other computer device (e.g., to one or more other aerial vehicles) in real time or in near-real time, or in one or more offline processes, via the network 280. Those of ordinary skill in the pertinent art would recognize that the aerial vehicle 210 or the data processing system 270 may operate or be operated by any of a number of computing devices that are capable of communicating over the network 280. Protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the processor 212, the processor 232 or the processor 274, or any other computers or control systems utilized by the aerial vehicle 210 or the data processing system 270 (e.g., by one or more other aerial vehicles), and having sequences of instructions which, when executed by a processor (e.g., a central processing unit, or "CPU"), cause the processor to perform all or a portion of the functions, services and/or methods described herein. Such computer executable instructions, programs, software, and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

The present disclosure references a number of computer-based functions or tasks that may be executed by one or more computer processors, systems or resources. In some implementations, each of such functions or tasks may be executed by processors associated with an aerial vehicle, e.g., the processor 212, or an imaging device, e.g., the processor 232, which may independently act upon instructions generated by such processors upon executing such functions or tasks. In some other implementations, each of such functions or tasks may be executed by processors that are external to an aerial vehicle or an imaging device, e.g., the processor 274, such as in one or more other physical, alternate or virtual locations, e.g., in a "cloud"-based environment. In still other implementations, such functions or tasks may be executed in a distributed manner, such as by computer processors, systems or resources in two or more distributed locations. For example, some of such functions or tasks may be executed by processors associated with one or more aerial vehicles or imaging devices, while other functions or tasks may be executed by processors located in one or more other physical, alternate or virtual locations.

Figure 3:
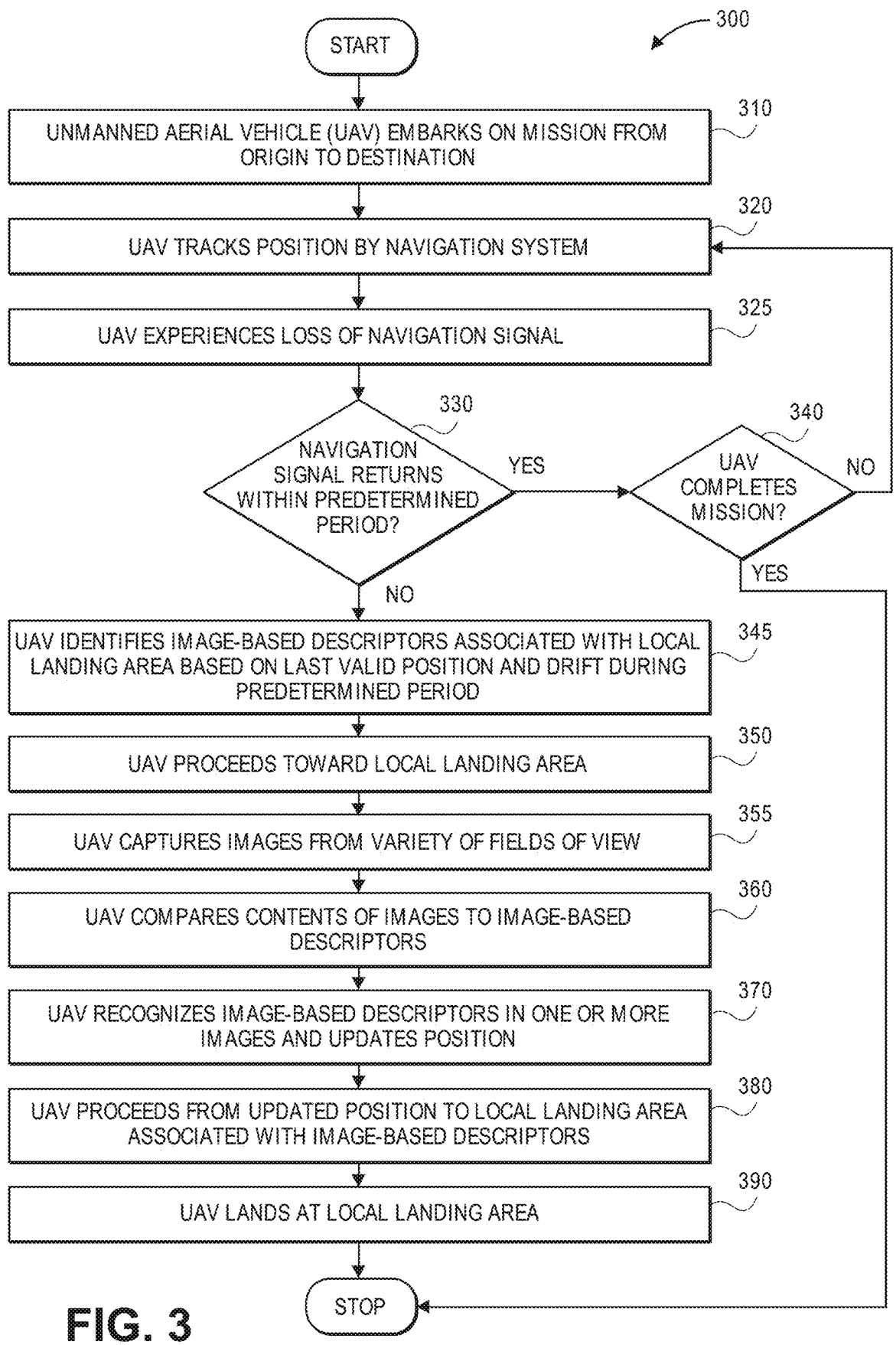
FIG. 3 is a flow chart of one process for safely landing an aerial vehicle in accordance with embodiments of the present disclosure.

Referring to FIG. 3, a flow chart 300 of one process for safely landing an aerial vehicle is shown. At box 310, an unmanned aerial vehicle embarks on a mission from an origin to a destination. The mission may have any purpose or intended result, or may have any number of purposes or intended results, e.g., a primary purpose or intended result, and/or one or more secondary purposes or intended results. For example, in some embodiments, the unmanned aerial vehicle may be configured to deliver a parcel from the origin to the destination. Alternatively, in some other embodiments, the unmanned aerial vehicle may be configured to conduct surveillance or monitoring operations (e.g., by imaging devices or other sensors provided aboard the unmanned aerial vehicle) within a vicinity of the origin or the destination, or in areas between the origin and the destination. The purpose or intended result of a mission to be performed by an aerial vehicle is not limited by any of the embodiments disclosed herein.

At box 320, the unmanned aerial vehicle tracks its position by signals received from a navigation system. For example, as is discussed above, the unmanned aerial vehicle may be outfitted with a GPS receiver that is configured to determine its position by interpreting signals received from multiple GPS satellites orbiting the Earth, e.g., by calculating a "time of flight" between the GPS satellite and the GPS receiver for each such signal. Alternatively, the unmanned aerial vehicle may track its position by signals received from any other type or form of navigation system, e.g., the GLONASS system, the Galileo GNSS system, the BeiDou system, or any other type or form of navigation system.

At box 325, the unmanned aerial vehicle experiences a loss of one or more navigation signals. Where the unmanned aerial vehicle is tracking its position at box 320 by the receipt of signals from three or more orbiting GPS satellites, the unmanned aerial vehicle may no longer receive signals from one or more of the orbiting GPS satellites, for any reason. For example, an environment in which the unmanned aerial vehicle operates may include one or more natural or artificial obstructions, such as trees or other plant life, buildings, landmasses or components thereof, which may stand between the unmanned aerial vehicle and a GPS satellite, thereby delaying or inhibiting the receipt, capture and interpretation of such signals. As another example, a GPS satellite may experience one or more faults, for any number of legitimate or illegitimate reasons.

At box 330, whether the lost navigation signals return after a predetermined period is determined. For example, the unmanned aerial vehicle may be configured to monitor and determine, following the loss of a navigation signal, whether the navigation signal returns after a sufficiently brief period of time, which may be selected on any basis (e.g., ten seconds). The period of time may be based on one or more parameters of the navigation system in general or transceivers or other communication components aboard the unmanned aerial vehicle in particular, or based on any allowable tolerances associated with navigation of the unmanned aerial vehicle from the origin to the destination. Alternatively, in some embodiments, such as where the unmanned aerial vehicle determines its position based on GPS signals received from multiple GPS satellites, the unmanned aerial vehicle may determine whether a signal is received by the unmanned aerial vehicle from the same GPS satellite from which the navigation signal was lost, or from a different unmanned aerial vehicle.

If the navigation signal returns within the predetermined period of time, then the process advances to box 340, where whether the unmanned aerial vehicle has completed the mission is determined. If the mission has been completed, then the process ends. If the mission has not yet been completed, then the process returns to box 320, where the unmanned aerial vehicle continues to track its position based on the receipt of navigation signals, e.g., from one or more GPS satellites.

If the navigation signal does not return within the predetermined period of time, however, then the process advances to box 345, where the unmanned aerial vehicle identifies one or more image-based descriptors associated with a local landing area based on a last valid position and any sensor drift, variables or other factors during the predetermined period of time. For example, where the unmanned aerial vehicle experiences a loss of GPS navigation signals while traveling along a known course and at a known airspeed, the unmanned aerial vehicle may determine a position by dead reckoning from a last known position of the unmanned aerial vehicle, advanced in a direction of the known course and by a distance defined by the known airspeed over the predetermined period of time. The determination of the position of the unmanned aerial vehicle may also take into account any operational or environmental effects. Alternatively, in some embodiments, an unmanned aerial vehicle need not wait for a predetermined period of time prior to identifying descriptors associated with a local landing area, or selecting one of a plurality of local landing areas.

Once the position of the unmanned aerial vehicle is determined, one or more local landing areas within a vicinity of the determined position may be identified. For example, the unmanned aerial vehicle may be programmed with information or data regarding a single landing area between the origin and the destination or within a vicinity of the origin or the destination that may be associated with the mission. In such embodiments, descriptors of landmarks or other features of the local landing area may be identified, e.g., in one or more onboard memory components, or received from one or more external sources over a network. Alternatively, the unmanned aerial vehicle may be programmed with information or data regarding multiple landing areas between the origin and the destination. In such embodiments, a nearest one of the local landing areas, or one of the local landing areas that may be reached by the unmanned aerial vehicle at the lowest cost, may be selected, and descriptors of the selected local landing area may be identified or received over a network. A cost of reaching a local landing area may be determined on any basis, including but not limited to financial costs, fuel or other energy required to reach the selected local landing area, or any other factors. Alternatively, or in addition to cost, one of a plurality of local landing areas may be selected on any basis, such as availability at the local landing area, prevailing weather conditions, or any other factors.

The descriptors may be any qualitative or quantitative description of one or more landmarks at or near a local landing area that may be derived from imaging data previously captured of the local landing area. For example, the descriptors may be visual or digital descriptions of aspects of imaging data associated with a landmark, e.g., portions of images such as contours, outlines, colors, textures, silhouettes, shapes or other characteristics of landmarks depicted within the imaging data. In some embodiments, the descriptors may be two-dimensional representations of one or more of such aspects. In some embodiments, the descriptors may be three-dimensional representations of one or more of such aspects. Alternatively, or additionally, the descriptors may be sets of data generated by machine-learning systems regarding aspects of imaging data depicting such landmarks, and such sets of data need not have any semantic relationship with the landing area or the landmark, nor be visually discernible within imaging data by humans.

At box 350, the unmanned aerial vehicle proceeds toward the local landing area, e.g., on a selected course, and at a selected speed and altitude. The course may be selected based on the last valid position of the unmanned aerial vehicle and a location of the local landing area. The speed and/or the altitude may be selected based on any temporary or standing operational constraints, or on any other basis. At box 355, the unmanned aerial vehicle captures images from a variety of fields of view. The images may be captured by a single imaging device that may be repositioned or reoriented toward each of the fields of view, or by multiple imaging devices, each of which covering at least one of the fields of view. Additionally, the images may be visual images (e.g., color, grayscale and/or black-and-white visual images), depth images, or any other type or form of images. In some embodiments, such as where a location of a nearest (or selected) local landing area is beyond an optical range of an imaging device, the aerial vehicle may be required to travel a substantial distance prior to or concurrent with capturing the images at box 355. Where the aerial vehicle must travel in order to arrive at a vicinity of a nearest (or selected) local landing area, the aerial vehicle may continue to track its positions and any areas of uncertainty associated with such positions by dead reckoning, or based on any other available navigation systems or techniques.

At box 360, the unmanned aerial vehicle compares the contents of the images to the one or more image-based descriptors that were identified at box 345. For example, where the descriptors include or are based on shapes, sizes, dimensions, attributes or features of one or more landmarks associated with a local landing area, the images captured from the various fields of view may evaluate the images to determine whether any of the images includes content that is consistent with one or more of the descriptors. Where the descriptors are generated based on previously captured imaging data according to one or more algorithms or techniques, the images captured at box 355 may be processed according to the same algorithms and techniques to generate descriptors thereof, and the descriptors may be compared to the descriptors identified at box 345. Images captured by an unmanned aerial vehicle (or descriptors generated therefrom) may be compared to image-based descriptors associated with a local landing area in any manner, in accordance with the present disclosure. For example, any type or form of image matching algorithm or technique may be used to determine whether the image-based descriptors identified at box 345 are present within the images captured at box 355.

At box 370, the unmanned aerial vehicle recognizes an image-based descriptor of a landmark at the local landing area within one or more of the images captured at box 355 and updates its position accordingly. For example, where the image-based descriptor is tagged or otherwise stored in association with coordinates or other identifiers of a position of a landmark or other aspect of the local landing area, a position of the unmanned aerial vehicle may be determined with respect to the position of the landmark, e.g., by triangulation or any other techniques, as detected within the one or more images.

At box 380, the unmanned aerial vehicle proceeds from the updated position determined at box 370 to the local landing area associated with the image-based descriptors. For example, where the position of the landmark is outside of the updated position of the unmanned aerial vehicle, the unmanned aerial vehicle may determine a course, a speed and/or an altitude to reach the location of the local landing area. In some embodiments, the location of the local landing area may already be within an area of uncertainty of the unmanned aerial vehicle, and the unmanned aerial vehicle need not travel very far, if at all, in order to reach the location of the local landing area.

At box 390, the unmanned aerial vehicle lands at the local landing area, e.g., by manipulating one or more propulsion motors and/or control surfaces to descend toward a selected surface at the local landing area, and the process ends.

As is discussed above, an aerial vehicle may be programmed with locations and visual descriptors of landmarks associated with safe landing areas, thereby enabling the aerial vehicle to travel toward a location of one of the safe landing areas, and to confirm its position at the location, by recognizing one or more visual descriptors of a landmark at the safe landing area. In this regard, the aerial vehicle may visually confirm its arrival at a location of the safe landing area by processing a limited amount of imaging data, and to a limited extent. Referring to FIGS. 4A through 4H, views of aspects of one system for safely landing an aerial vehicle in accordance with embodiments of the present disclosure are shown. Except where otherwise noted, reference numerals preceded by the number "4" shown in FIGS. 4A through 4H indicate components or features that are similar to components or features having reference numerals preceded by the number "2" shown in FIG. 2 or by the number "1" shown in FIGS. 1A through 1G.

Figure 4A:
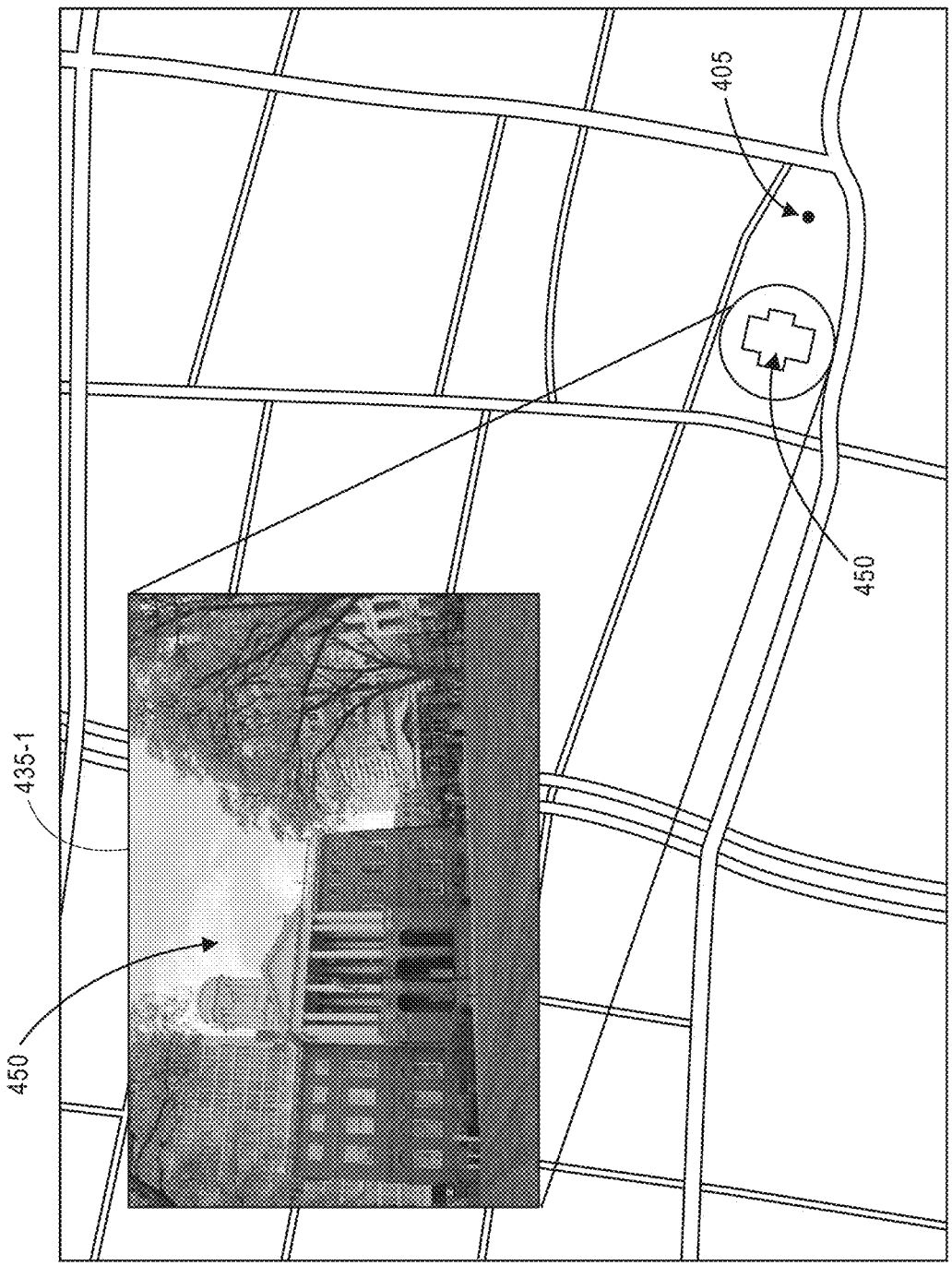
FIGS. 4A through 4H are views of aspects of one system for safely landing an aerial vehicle in accordance with embodiments of the present disclosure.
Figure 4B:
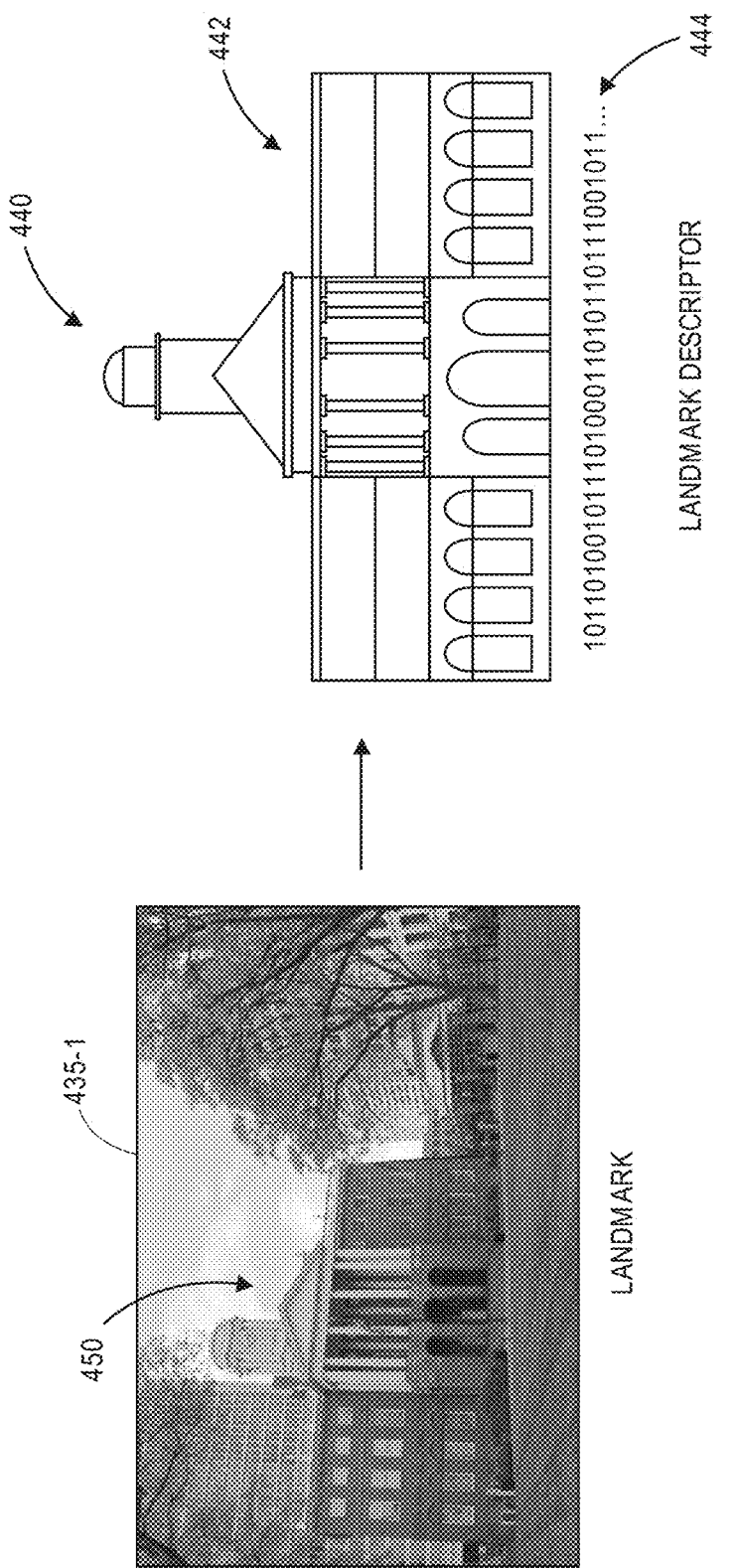

As is shown in FIG. 4A, a landmark 450 is associated with a location 405 of a safe landing area. An image 435-1 depicts the landmark 450. The image 435-1 may be captured by any type or form of imaging device, e.g., a ground-based imaging device or an imaging device aboard an aerial vehicle at any altitude, and at any time. As is shown in FIG. 4B, the image 435-1 may be processed to derive a descriptor 440 of the landmark 450. The descriptor 440 includes a set of data 442 representative of one or more contours, outlines, colors, textures, silhouettes, shapes or other characteristics of the landmark 450, and a set of data 444 representative of a vector or another output from a trained machine learning system or algorithm, and need not have any semantic relationship with the landing area or the landmark, nor be visually discernible within the image 435-1 by humans.

Figure 4C:
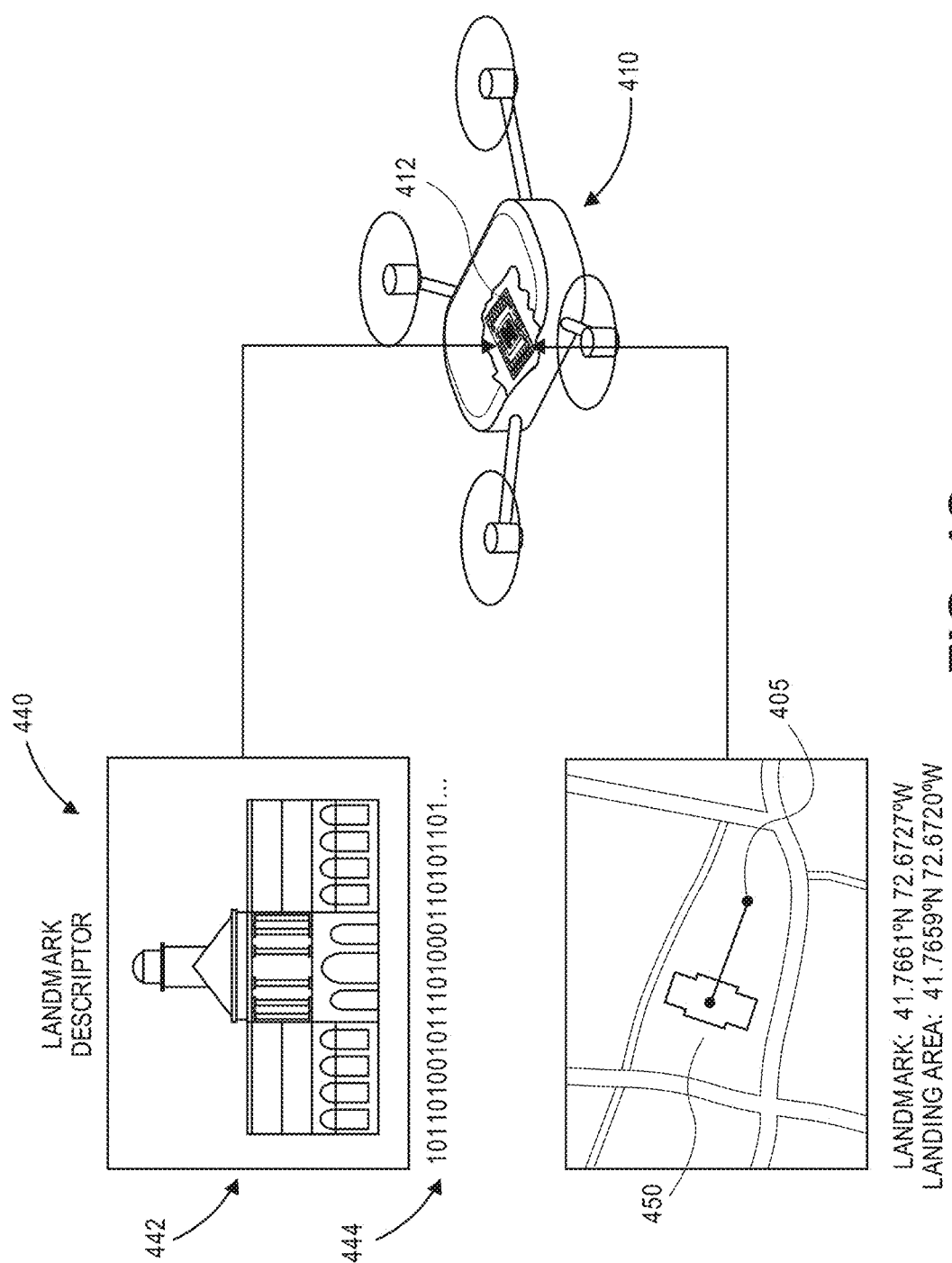

As is shown in FIG. 4C, prior to embarking upon a mission, one or more computer devices 412 or systems aboard the aerial vehicle 410 may be programmed with the descriptor 440 of the landmark 450, as well as locations (e.g., sets of coordinates) corresponding to the landing area 405 and the landmark 450. The locations of the landing area 405 and the landmark 450 may be identified by single pairs of coordinates, such as is shown in FIG. 4C, or by one or more sets of coordinates (e.g., coordinate pairs), or two-dimensional areas or regions defined by sets of coordinates. Alternatively, the aerial vehicle 410 may be programmed with a plurality of descriptors of landmarks and/or locations of landmarks or landing areas prior to embarking on any given mission.

Figure 4D:

As is shown in FIG. 4D, after having been programmed with the descriptor 440 of the landmark 450 (e.g., the sets of data 442,444), and the locations of the landing area 405 and the landmark 450, the aerial vehicle 410 may embark upon the mission, e.g., by traveling along a course 406 and at a selected speed or altitude in accordance with a mission plan or transit plan, or on any other basis. The mission may involve a delivery of a parcel from an origin to a destination, a surveillance or monitoring operation, or any other operations. The aerial vehicle 410 may track its position and/or remain on the course 406 by a navigation system 490, e.g., the GPS system, the GLONASS system, the Galileo GNSS system, the BeiDou system, or others.

Figure 4E:
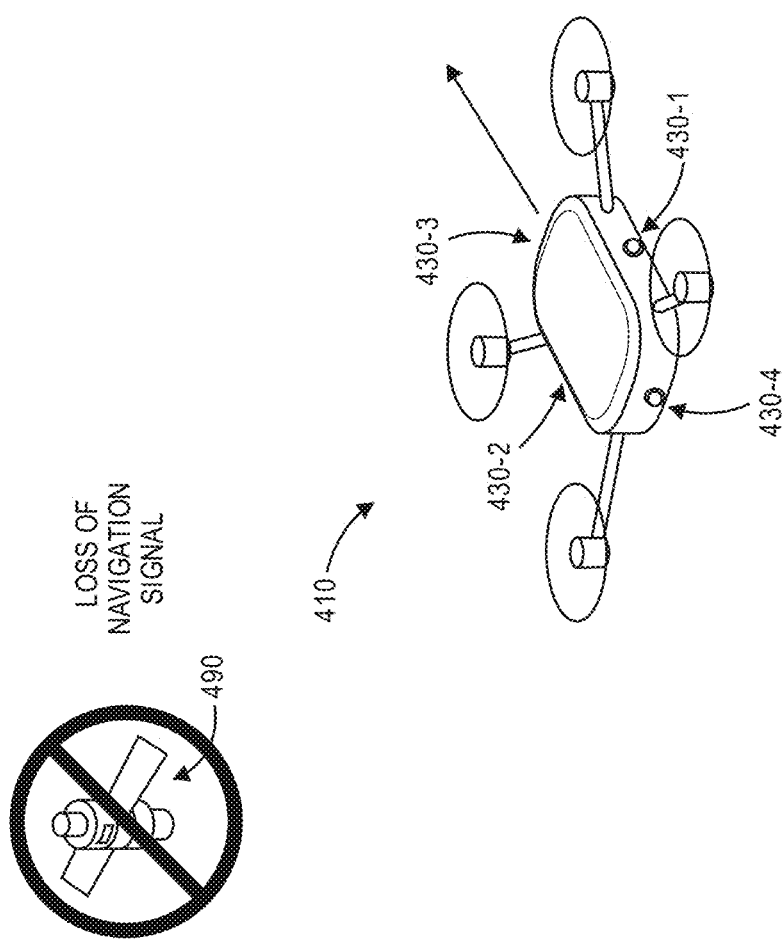
Figure 4F:

As is shown in FIGS. 4E and 4F, upon experiencing a loss of navigation signals from the navigation system 490, the aerial vehicle 410 may capture imaging data by imaging devices 430-1, 430-2, 430-3, 430-4. For example, because the imaging devices 430-1, 430-2, 430-3, 430-4 are mounted about a perimeter of the aerial vehicle 410, such as is shown in FIG. 4E, the aerial vehicle 410 may capture imaging data from fields of view covering all or substantial portions of a perimeter of the aerial vehicle 410, such as is shown in FIG. 4F. Alternatively, in some embodiments, the aerial vehicle 410 may feature any number of imaging devices, e.g., a single imaging device, such as the imaging device 130 of the aerial vehicle 110 shown in FIG. 1A, that includes one or more features for manually or automatically panning, tilting and/or rolling the field of view of the imaging device 130.

Figure 4G:
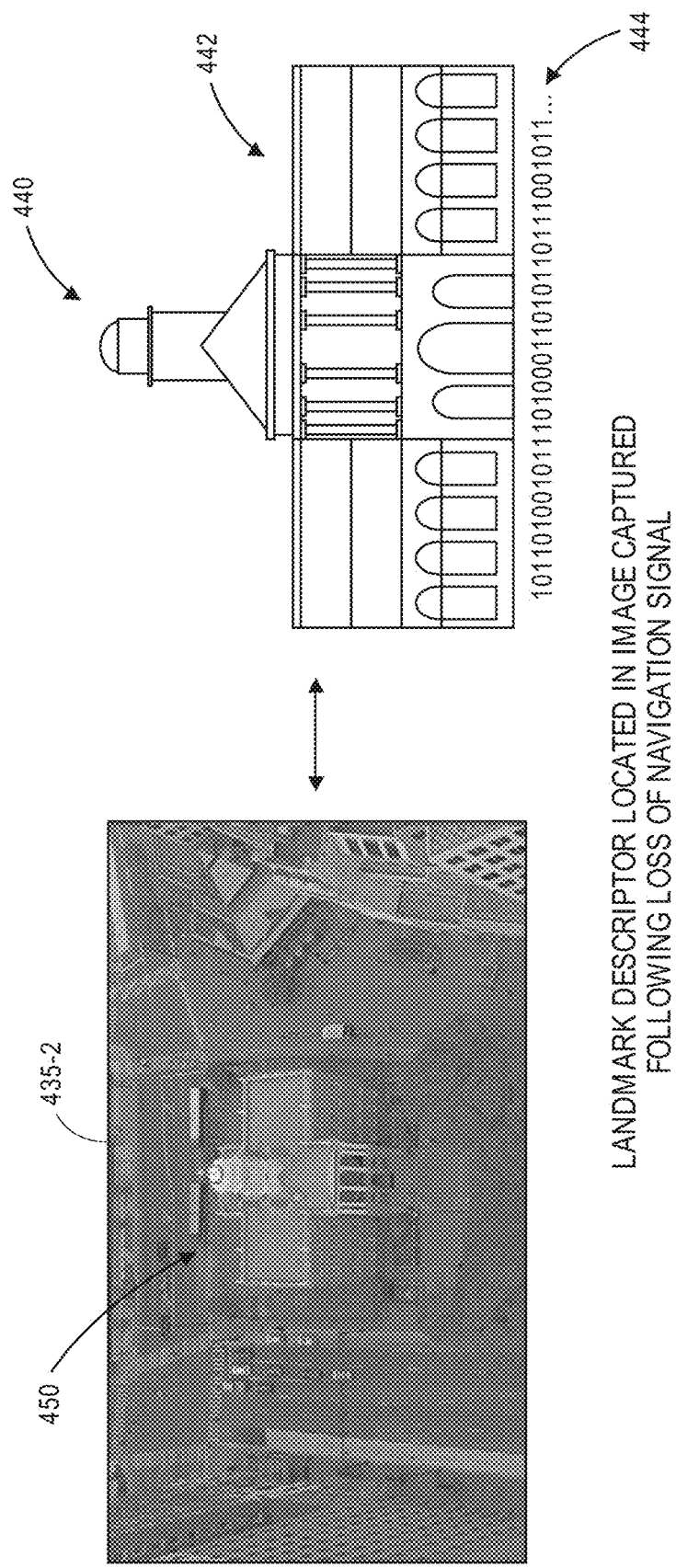

Imaging data captured by the imaging devices 430-1, 430-2, 430-3, 430-4 may be processed to determine whether the landmark 450 is depicted therein based on the visual descriptor 440. In some embodiments, the imaging data may be processed according to one or more detection or recognition algorithms or techniques to determine whether one or more contours, outlines, colors, textures, silhouettes, shapes or other characteristics that are consistent with (e.g., match) the set of data 442 are depicted therein. In some embodiments, the imaging data may be processed according to the same algorithms or techniques that were used to generate the set of data 444, and an output of such algorithms or techniques may be compared to the set of data 444. For example, as is shown in FIG. 4G, an image 435-2 captured by the imaging device 430-2 is determined to depict the landmark 450 based on the visual descriptor 440, e.g., by matching the set of data 442 or the set of data 444 to the image 435-2. Once the image 435-2 has been determined to depict the landmark 450 based on the visual descriptor 440, a position of the aerial vehicle 410 may be determined based on the known position of the landmark 450, e.g., by triangulation with respect to a bearing to the landmark 450, based on the field of view of the imaging device 430-2.

Figure 4H:
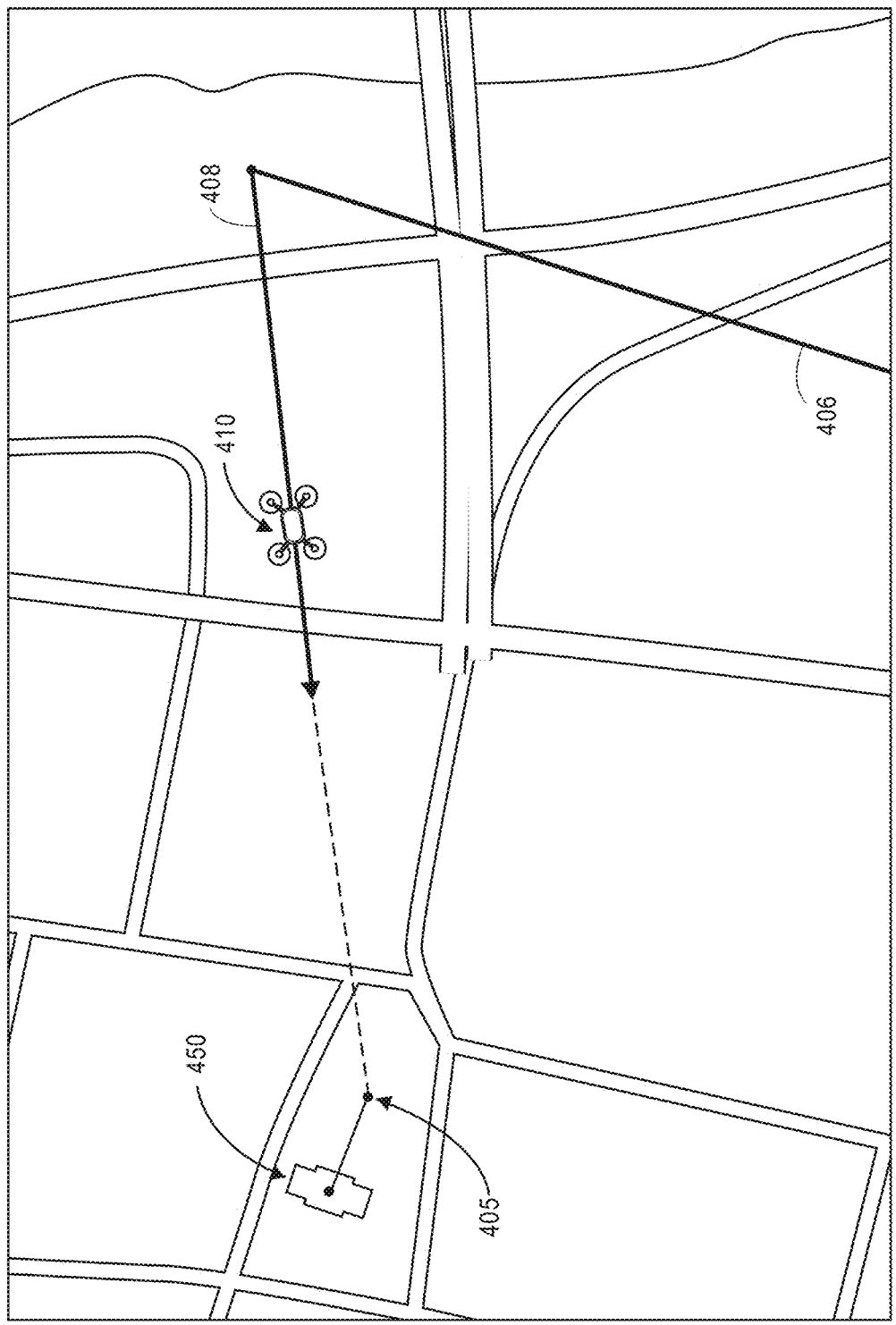

As is shown in FIG. 4H, upon confirming that the aerial vehicle 410 is within a vicinity of the landmark 450, the aerial vehicle 410 may travel toward the landing area 405, and initiate a landing operation there. Alternatively, in some embodiments, the aerial vehicle 410 may be required to travel for a substantial distance prior to or while capturing any number of frames of imaging data, prior to detecting the landmark 450 therein.

Figure 5:
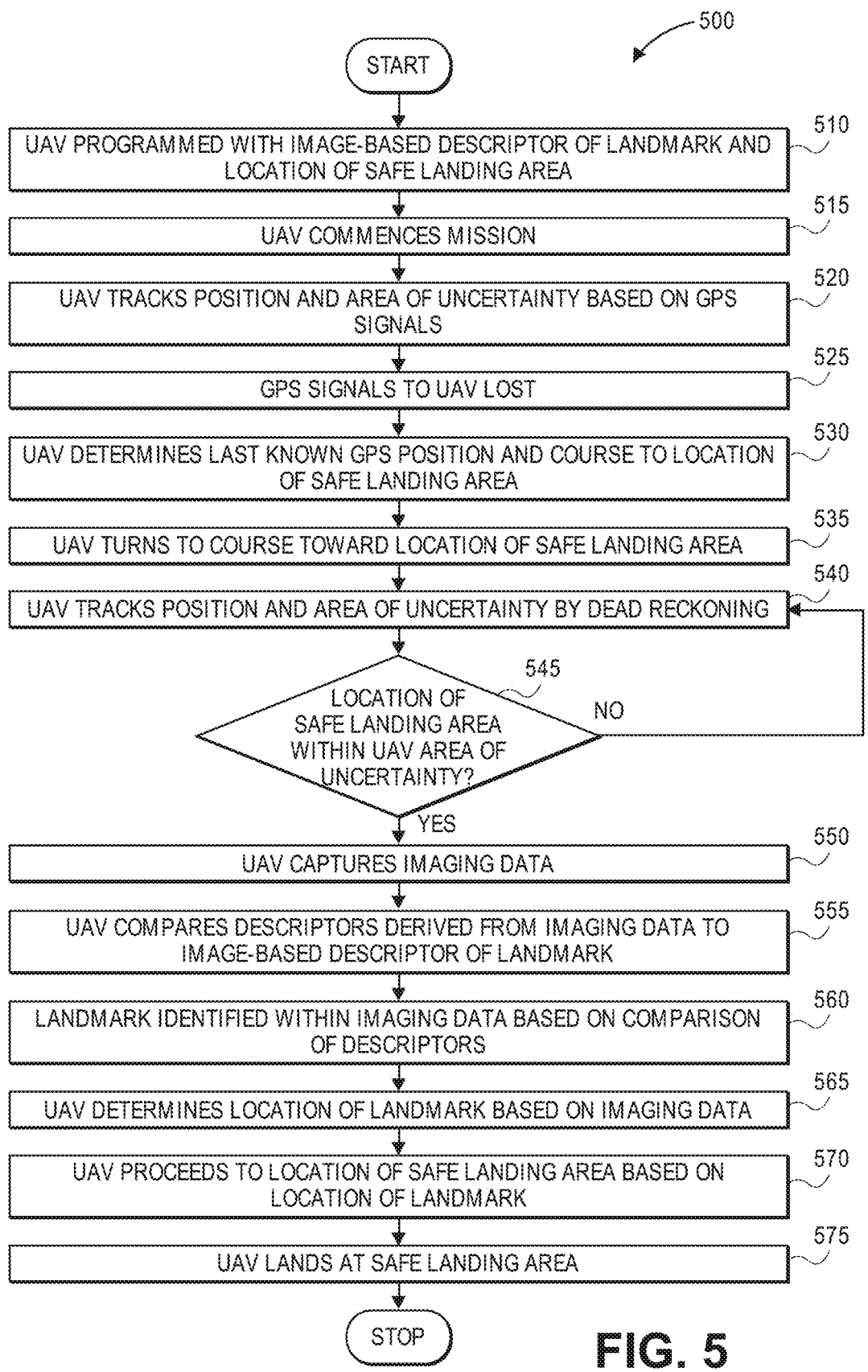
FIG. 5 is a flow chart of one process for safely landing an aerial vehicle in accordance with embodiments of the present disclosure.

Referring to FIG. 5, a flow chart 500 of one process for safely landing an aerial vehicle is shown. At box 510, an unmanned aerial vehicle is programmed with an image-based descriptor of a landmark, and a location of a safe landing area. The descriptor may be one or more qualitative or quantitative labels or descriptions of aspects of landmarks depicted within imaging data, such as one or more contours, outlines, colors, textures, silhouettes, shapes or other characteristics, or one or more vectors or other sets of data, e.g., sets of data generated based on an output from a machine learning algorithm or technique. The descriptor is derived from imaging data previously captured from the landmark, e.g., during a prior arrival at or departure from the safe landing area, or during the performance of one or more missions within a vicinity of the landmark. For example, the images from which a descriptor is derived may be captured by a ground-based or airborne imaging device, or a combination of ground-based and/or airborne imaging devices. Alternatively, the images may be captured from a space-based imaging device, e.g., an imaging device provided aboard an orbiting satellite.

In some embodiments, the landmark may be any physical object or objects that may be associated with a location and detected within imaging data, such as a building, natural plant life or a geologic formation, or a combination of buildings, natural plant life or geologic formations. Additionally, the location of the safe landing area may be referenced by a pair of coordinates (e.g., a latitude and a longitude) corresponding to a single point, or a plurality of pairs of coordinates (e.g., pairs of latitudes and longitudes) corresponding to points defining a shape or sector in two-dimensional space, such as a polygon, a circle or other curvilinear shape, or the like. Additionally, any number of landmarks may be associated with a given safe landing area, such as where a landing area is surrounded by any number of buildings, trees or other structures or objects.

At box 515, the unmanned aerial vehicle commences a mission, e.g., a delivery, a surveillance or monitoring operation, or any other mission. At box 520, the unmanned aerial vehicle tracks its position and an area of uncertainty based on a plurality of GPS signals. For example, as is discussed above, upon receiving three or more GPS signals, an unmanned aerial vehicle may determine an approximate position to within an accuracy level of approximately 7.8 meters. The position, and an area of uncertainty defined by the level of accuracy of the GPS signals, may be determined and tracked based on such signals. Alternatively, the position may be determined using any system, such as the GLONASS system, the Galileo GNSS system, the BeiDou system, or others. In some embodiments, the unmanned aerial vehicle may determine its position on a continuous basis, e.g., as the plurality of GPS signals is received. In some other embodiments, the unmanned aerial vehicle may determine its position periodically, e.g., at regular intervals, such as every second, ten seconds, thirty seconds, or one minute, or others.

At box 525, one or more of the GPS signals to the unmanned aerial vehicle is lost. The GPS signal or signals may be lost for any reason, including an operational fault in one or more satellites or a transceiver aboard the unmanned aerial vehicle, as well as any environmental or operational conditions or characteristics, including but not limited to weather, the presence of one or more natural or artificial obstructions, which may be temporary or permanent in nature, or for any other reason. For example, in some embodiments, where an unmanned aerial vehicle determines its position from GPS signals received from three or more GPS satellites, receiving GPS signals from two or fewer satellites renders the unmanned aerial vehicle unable to determine its position from the GPS system.

At box 530, the unmanned aerial vehicle determines its last known GPS position and a course to the location of the safe landing area. The course to the location of the safe landing area may be calculated from the last known GPS position, or from a current position determined based on the last known GPS position, e.g., by dead reckoning, using a course and airspeed of the unmanned aerial vehicle, as well as an elapsed time since the last known GPS position was determined. At box 535, the unmanned aerial vehicle turns to a course toward the location of the safe landing area, e.g., by providing one or more instructions to one or more propulsion motors and/or control surfaces. Alternatively, or additionally, the unmanned aerial vehicle may also select a speed and/or altitude based on the loss of the GPS signals, the location of the safe landing area, or on any other basis. At box 540, the unmanned aerial vehicle tracks its position and an area of uncertainty about the position by dead reckoning. For example, where a course and airspeed of the unmanned aerial vehicle are known, the position of the unmanned aerial vehicle may be determined over time by advancing the aerial vehicle on the course and at the speed by a distance corresponding to a product of the speed and a time since a GPS position was last determined. Whereas a GPS position has a substantially constant level of accuracy, and therefore a substantially constant area of uncertainty, an area of uncertainty of a dead-reckoned position expands over time due to factors such as sensor drift or other variables.

At box 545, whether the location of the safe landing area is within the unmanned aerial vehicle's area of uncertainty is determined. If the location of the safe landing area is not within the area of uncertainty, then the process returns to box 540, where the unmanned aerial vehicle continues to track its position and the area of uncertainty by dead reckoning.

If the location of the safe landing area is within the unmanned aerial vehicle's area of uncertainty, then the process advances to box 550, where the unmanned aerial vehicle captures imaging data of the area of uncertainty, e.g., by one or more onboard cameras. At box 555, the unmanned aerial vehicle compares the imaging data captured at box 550 to the image-based descriptor of the landmark, e.g., by one or more matching algorithms or techniques. For example, in some embodiments, the imaging data captured at box 550 may be directly compared to the image-based descriptor of the landmark with which the unmanned aerial vehicle was programmed at box 510. Alternatively, in some embodiments, a descriptor may be generated based on the imaging data captured at box 550, and compared to the image-based descriptor of the landmark with which the unmanned aerial vehicle was programmed at box 510. At box 560, the landmark is identified within the imaging data based on the descriptor.

At box 565, the location of the unmanned aerial vehicle is determined from the imaging data in which the landmark is identified. For example, in some embodiments, where a location of the landmark is known, a depiction of the landmark within the imaging data and the known location of the landmark may be used to determine a location of the unmanned aerial vehicle based on an angle of orientation or a field of view of the imaging device that captured the imaging data at box 550.

At box 570, the UAV proceeds to the location of the safe landing area based on the location of the unmanned aerial vehicle as determined at box 565, e.g., by selecting a course, a speed and/or an altitude, as necessary. At box 575, the UAV lands at the safe landing area, and the process ends.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

For example, although some of the embodiments disclosed herein reference the navigation of unmanned aerial vehicles, those of ordinary skill in the pertinent arts will recognize that the systems and methods disclosed herein are not so limited, and may be utilized in connection with any type or form of vehicle (e.g., manned or unmanned), or for any type of function for which position information is desired.

Furthermore, although some of the embodiments disclosed herein reference the use of positions obtained from satellites of the GPS system, e.g., based on signals transmitted to a GPS receiver operated by an aerial vehicle, those of ordinary skill in the pertinent arts will recognize that the systems and methods disclosed herein are not so limited. Position information may be obtained from one or more of any type of signals transmitted from any source, including but not limited to the GPS system and also any other navigation or positioning systems, e.g., one or more other global navigation satellite systems. Moreover, references to "locations" or "positions" may relate to locations or positions in two dimensions, e.g., at latitudes and longitudes, or locations or positions in three dimensions, at latitudes and longitudes, as well as at altitudes. For example, an aerial vehicle may be determined to be at a position or location of a safe landing area or a landmark where the aerial vehicle is grounded at the position or the location of the safe landing area or the landmark, or where the unmanned aerial vehicle is hovering, ascending or descending above the position or the location of the landmark. The words "location" and "position" may be used interchangeably herein.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the processes represented in the flow charts of FIG. 3 or 5, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. An aerial vehicle comprising:
a plurality of propulsion motors;
a position sensor;
an imaging device;
at least one memory component; and
at least one computer processor in communication with each of the plurality of propulsion motors, the position sensor, the imaging device and the at least one memory component,
wherein the at least one computer processor is configured to execute instructions for performing a method comprising:
receiving, over a network, information regarding a mission to be performed by the aerial vehicle, wherein the information regarding the mission comprises:
  a location of an origin of the mission;
  a location of a destination for the mission;
  a location of a safe landing area associated with the mission, wherein the safe landing area associated with the mission does not include the location of the destination for the mission; and
  a visual descriptor of a landmark associated with the location of the safe landing area associated with the mission;
storing the information regarding the mission in the at least one memory component;
causing the aerial vehicle to depart from the origin;
receiving signals from at least three Global Positioning System (GPS) satellites by the position sensor at a first time, wherein the aerial vehicle is traveling on a first course and at a first speed at the first time;
determining a first position of the aerial vehicle at the first time based at least in part on the signals received at the first time;
determining that signals are received from fewer than three GPS satellites by the position sensor at a second time;
in response to determining that signals were received from fewer than three GPS satellites by the position sensor at the second time,
  determining a second position of the aerial vehicle at the second time based at least in part on the first course, the first speed and a difference between the first time and the second time;
  selecting at least a second course and a second speed for the aerial vehicle based at least in part on the second position of the aerial vehicle at the second time and the location of the safe landing area associated with the mission;
  causing the aerial vehicle to travel on the second course and at the second speed;
  determining a third position of the aerial vehicle at a third time based at least in part on the second course, the second speed and a difference between the second time and the third time;

determining that the location of the safe landing area associated with the mission is within an area of uncertainty associated with the third position at the third time; and in response to determining that the location of the safe landing area associated with the mission is within the area of uncertainty associated with the third position at the third time, capturing imaging data by the imaging device; and detecting the landmark within the imaging data based at least in part on the visual descriptor; and in response to detecting the landmark within the imaging data, confirming that the aerial vehicle is above the safe landing area associated with the mission; and landing the aerial vehicle at the safe landing area associated with the mission.

2. The aerial vehicle of claim 1, wherein the information regarding the mission comprises locations of a plurality of safe landing areas associated with the mission and visual descriptors of landmarks associated with each of the locations, and wherein the method further comprises:

in response to determining that signals are received from fewer than three GPS satellites by the position sensor at the second time, selecting one of the plurality of safe landing areas based at least in part on a cost for the aerial vehicle to travel to the selected one of the safe landing areas, wherein the first landing area is the selected one of the safe landing areas.

3. The aerial vehicle of claim 1, wherein the landmark is one of:

a dwelling associated with the destination;

a building;

a structure;

natural plant life; or a geologic formation.

4. The aerial vehicle of claim 1, wherein the visual descriptor is a set of data corresponding to at least one of a contour, an outline, a color, a texture, a silhouette or a shape of at least a portion of the landmark.

5. A method comprising:

prior to a first time, receiving first information regarding a plurality of landing areas for the aerial vehicle, wherein the first information comprises descriptors of landmarks associated with each of the plurality of landing areas, and wherein the aerial vehicle comprises at least one computer processor, at least one memory component, a position sensor and a first imaging device; and causing the descriptors to be stored on at least one memory component of the aerial vehicle, wherein one of the descriptors stored on the at least one memory component is a descriptor of a landmark associated with a first landing area;

receiving second information from a global navigation system by the position sensor aboard the aerial vehicle at the first time;

determining a first position of the aerial vehicle at the first time based at least in part on the second information;

determining that third information is not received by the position sensor from the global navigation system at a second time, wherein the aerial vehicle is traveling on a first course and a first speed at the first time and the second time, and wherein the second time follows the first time;

in response to determining that the third information is not received by the position sensor from the global navigation system at the second time, calculating a second position of the aerial vehicle at the second time based at least in part on the first course, the first speed and a difference between the first time and the second time;

determining, for each of the plurality of landing areas, at least one of a cost, a distance or a time for the aerial vehicle to travel from the second position to one of the landing areas;

selecting the first landing area based at least in part on the at least one of the cost, the distance or the time determined for the aerial vehicle to travel from the second position to the first landing area;

calculating a second course from the second position to the first landing area;

causing the aerial vehicle to travel on the second course and at a second speed;

capturing first imaging data by the first imaging device aboard the aerial vehicle at a third time, wherein the third time follows the second time;

determining that the landmark is depicted within the first imaging data based at least in part on the descriptor of the landmark associated with the first landing area; and in response to determining that the landmark associated with the first landing area is depicted within the first imaging data, determining that the aerial vehicle is within a vicinity of the first landing area; and causing the aerial vehicle to land at the first landing area.

6. The method of claim 5, wherein that the aerial vehicle is within the vicinity of the first landing area is determined based at least in part on the second course, the second speed and a difference between the second time and the third time.

7. The method of claim 5, wherein determining that the aerial vehicle is within the vicinity of the first landing area further comprises:

calculating a third position at the third time and an area of uncertainty of the aerial vehicle about the third position based at least in part on the second course, the second speed, the difference between the second time and the third time, and at least one variable associated with the second position; and determining that the first landing area is within the area of uncertainty about the third position at the third time, wherein the first imaging data is captured by the first imaging device at the third time in response to determining that the location of the first landing area is within the area of uncertainty about the third position.

8. The method of claim 5, further comprising:

prior to the first time, identifying second imaging data depicting at least the landmark associated with the first landing area, wherein the second imaging data was captured by a second imaging device;

generating at least the descriptor of the landmark associated with the first landing area based at least in part on the second imaging data; and transmitting the first information to the aerial vehicle over a network, wherein the first information comprises at least the descriptor of the landmark associated with the first landing area and a location of the landmark associated with the first landing area.

9. The method of claim 8, wherein the descriptor of the landmark associated with the first landing area is a set of data corresponding to at least one of a contour, an outline, a color, a texture, a silhouette or a shape of at least a portion of the landmark associated with the first landing area,
   wherein generating at least the descriptor of the landmark associated with the first landing area comprises:
      detecting the at least one of the contour, the outline, the color, the texture, the silhouette or the shape within the second imaging data, and
   wherein determining that the landmark associated with the first landing area is depicted within the first imaging data comprises:
      detecting, by the at least one computer processor, the at least one of the contour, the outline, the color, the texture, the silhouette or the shape within the first imaging data.

10. The method of claim 8, wherein generating at least the descriptor of the landmark associated with the first landing area comprises:
   providing the second imaging data to at least one machine learning algorithm as a first input; and
   generating a first descriptor based at least in part on a first output received from the at least one machine learning algorithm, and
   wherein determining that the landmark associated with the first landing area is depicted within the first imaging data comprises:
   providing the first imaging data to the at least one machine learning algorithm as a second input;
   generating a second descriptor based at least in part on a second output received from the at least one machine learning algorithm; and
   matching the first descriptor to the second descriptor.

11. The method of claim 5, wherein the landmark associated with the first landing area is one of:
   a dwelling;
   a building;
   a structure;
   at least one plant; or
   at least one geologic formation.

12. The method of claim 5, wherein the global navigation system is the Global Positioning System (GPS),
   wherein the second information comprises signals from at least three satellites of the GPS system,
   wherein determining the first position of the aerial vehicle at the first time comprises:
      determining the first position based at least in part on the signals received from the at least three satellites of the GPS system at the first time,
   wherein determining that the third information is not received by the position sensor from the global navigation system at the second time comprises:
      receiving signals from fewer than three satellites of the GPS system at approximately the second time.

13. The method of claim 5, wherein the aerial vehicle is configured for a delivery of at least one item from an origin to a destination, and
   wherein the first landing area does not include the destination.

14. A method comprising:
   prior to a first time,
      programming at least one memory component provided aboard an unmanned aerial vehicle with locations of a plurality of landing areas and visual descriptors of each of the landing areas, wherein a first landing area is one of the plurality of landing areas;
   receiving Global Positioning System (GPS) signals from at least three GPS satellites by a GPS receiver aboard the unmanned aerial vehicle at the first time, wherein the unmanned aerial vehicle is traveling on a first course and at a first speed at the first time;
   determining a first position of the unmanned aerial vehicle at the first time based at least in part on the plurality of GPS signals;
   determining that GPS signals are not received from at least three GPS satellites by the GPS receiver at a second time, wherein the second time follows the first time;
   in response to determining that GPS signals are not received from at least three GPS satellites by the GPS receiver at the second time,
      calculating a second position of the unmanned aerial vehicle at the second time based at least in part on the first course, the first speed and a difference between the first time and the second time;
      determining, for each of the plurality of landing areas, at least one of a cost, a distance or a time for the aerial vehicle to travel from the second position to each of the locations of the landing areas;
      selecting the first landing area based at least in part on the at least one of the cost, the distance or the time determined for the aerial vehicle to travel from the second position to a location of the first landing area;
      determining at least a second course from the second position of the unmanned aerial vehicle to the location of the first landing area;
      causing the unmanned aerial vehicle to travel on the second course and at a second speed;
      determining that the unmanned aerial vehicle is within a vicinity of the location of the first landing area at a third time based at least in part on the second course, the second speed and a difference between the second time and the third time, wherein the third time follows the second time;
      capturing first imaging data by at least one imaging device aboard the unmanned aerial vehicle;
      detecting the landmark in at least some of the first imaging data based at least in part on the visual descriptor;
      in response to detecting the landmark in at least some of the first imaging data,
         confirming that the unmanned aerial vehicle is at the location of the first landing area based at least in part on the landmark; and
         causing the unmanned aerial vehicle to land at the first landing area.

15. The method of claim 14, wherein determining that the GPS signals are not received from at least three GPS satellites by the GPS receiver at the second time comprises:
   determining that GPS signals are not received from at least three GPS satellites by the GPS receiver at a fourth time, wherein the fourth time follows the first time and precedes the second time by a predetermined period of time.

16. The method of claim 14, wherein detecting the landmark in at least some of the first imaging data based at least in part on the visual descriptor comprises:

providing at least some of the first imaging data to a first machine learning algorithm as an input;

receiving an output from the first machine learning algorithm; and matching the first imaging data to the visual descriptor based at least in part on the output.

17. The method of claim 14, wherein the landmark is one of:
  - a dwelling;
  - a building;
  - a structure;
  - at least one plant; or
  - at least one geologic formation.

18. The method of claim 14, wherein causing the unmanned aerial vehicle to travel on the second course and at the second speed comprises:

tracking the aerial vehicle by dead reckoning, and wherein determining that the unmanned aerial vehicle is within the vicinity of the location of the landing area at the third time comprises:

generating an area of uncertainty of the unmanned aerial vehicle at the third time based at least in part on the second course, the second speed and drift associated with the GPS receiver; and determining that the location of the landing area is within the area of uncertainty.

19. The method of claim 14, wherein the visual descriptor of the landmark is a set of data corresponding to at least one of a contour, an outline, a color, a texture, a silhouette or a shape of at least a portion of the landmark, and wherein detecting the landmark in the at least some of the first imaging data comprises:

detecting the at least one of the contour, the outline, the color, the texture, the silhouette or the shape within the first imaging data.

20. The method of claim 14, further comprising:

prior to the first time, programming the unmanned aerial vehicle to deliver at least one item from an origin to a destination, wherein the destination is not within the first landing area.

* * * * *